(12) United States Patent
Kaneko et al.

(10) Patent No.: US 9,891,455 B2
(45) Date of Patent: Feb. 13, 2018

(54) DISPLAY DEVICE AND METHOD FOR MANUFACTURING THE SAME

(71) Applicant: Japan Display Inc., Tokyo (JP)

(72) Inventors: Hideki Kaneko, Tokyo (JP); Hiroki Sugiyama, Tokyo (JP); Hiroshi Inamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 205 days.

(21) Appl. No.: 14/573,168

(22) Filed: Dec. 17, 2014

(65) Prior Publication Data

US 2015/0189261 A1 Jul. 2, 2015

(30) Foreign Application Priority Data

Dec. 27, 2013 (JP) ................... 2013-272144

(51) Int. Cl.
*H04N 9/47* (2006.01)
*G02B 27/22* (2006.01)
*G02F 1/133* (2006.01)
*G09G 3/28* (2013.01)
(Continued)

(52) U.S. Cl.
CPC ........... *G02F 1/1333* (2013.01); *G03B 35/24* (2013.01); *H04N 13/0409* (2013.01);
(Continued)

(58) Field of Classification Search
CPC .............. G02B 27/225; G02B 27/2214; G02B 27/2228; G02B 27/22; G09G 3/003;
(Continued)

(56) References Cited

U.S. PATENT DOCUMENTS 6,040,807 A * 3/2000 Hamagishi ......... G02B 27/2214
345/6
6,466,186 B1 * 10/2002 Shimizu ............... G09G 3/2942
345/60
(Continued)

FOREIGN PATENT DOCUMENTS

JP    H07-294849 A    11/1995
JP    H10-174127 A    6/1998
(Continued)

OTHER PUBLICATIONS

Japanese Office Action (with English translation) dated Sep. 16, 2016 in corresponding Japanese application No. 2013-272144 (11 pages).

*Primary Examiner* — Thai Tran
*Assistant Examiner* — Syed Hasan
(74) *Attorney, Agent, or Firm* — K&L Gates LLP

(57) ABSTRACT

According to an aspect, a display device includes a display unit, a parallax adjuster that includes a plurality of unit areas, a controller that detects positions of a right eye and a left eye of a user, determines a pixel display of pixels of a right eye image and a left eye image, and sets a light transmission state to the unit areas in accordance with the positions of the right eye and the left eye and the pixel display; a plurality of conductors that are provided corresponding to the respective unit areas and each of which applies a signal to set the light transmission state of the unit area to the corresponding unit area; and a coupling unit that electrically couples the conductors together, the coupling unit providing a certain resistance value between the conductors.

7 Claims, 20 Drawing Sheets

(51) Int. Cl.
*G09G 5/00* (2006.01)
*G02F 1/1333* (2006.01)
*G03B 35/24* (2006.01)
*H04N 13/04* (2006.01)
*G09G 3/294* (2013.01)
*G02B 27/01* (2006.01)

(52) U.S. Cl.
CPC ..... *H04N 13/0434* (2013.01); *H04N 13/0475* (2013.01); *H04N 13/0477* (2013.01); *G02B 2027/0118* (2013.01); *G09G 3/2942* (2013.01); *G09G 2300/023* (2013.01); *G09G 2300/0866* (2013.01)

(58) Field of Classification Search
CPC ........... G09G 2360/16; H04N 13/0404; H04N 13/0409; H04N 13/0411; G02F 1/13306; G02F 1/133345
USPC .................. 348/57, 54, 56; 345/6, 7, 60, 63; 359/462, 466, 467, 472; 349/33
See application file for complete search history.

(56) References Cited

U.S. PATENT DOCUMENTS

| | | | |
|---|---|---|---|
| 9,377,631 B2 * | 6/2016 | Huang | ............... G02B 27/2214 |
| 2002/0135731 A1 * | 9/2002 | Wolfe | .................... G09G 5/003 |
| | | | 349/192 |
| 2010/0321621 A1 | 12/2010 | Kikuchi et al. | |
| 2011/0006979 A1 | 1/2011 | Min et al. | |
| 2015/0077669 A1 * | 3/2015 | Wu | ........................ G02B 27/22 |
| | | | 349/33 |

FOREIGN PATENT DOCUMENTS

| | | | |
|---|---|---|---|
| JP | 2004-325494 A | 11/2004 | |
| JP | 2005-157033 | 6/2005 | |
| JP | 2011-018049 | 1/2011 | |
| JP | 2013-195955 A | 9/2013 | |
| KR | 20130058517 A * | 6/2013 | ................ C08L 3/00 |
| WO | 2009/069358 A1 | 6/2009 | |
| WO | 2013/069387 A1 | 4/2015 | |

* cited by examiner

FIG.12
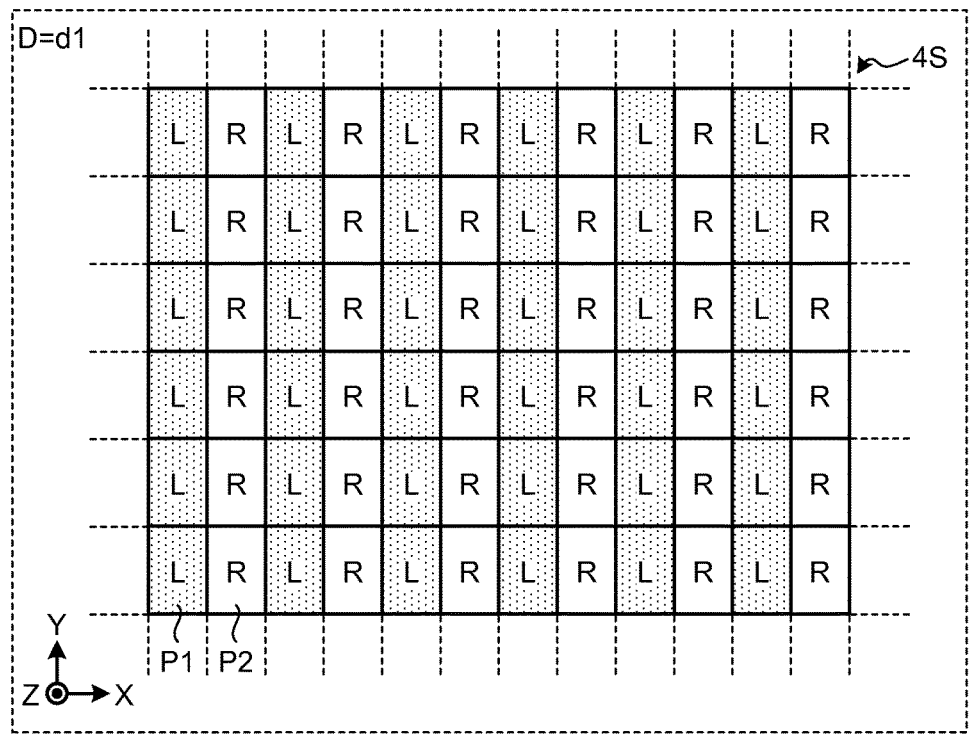
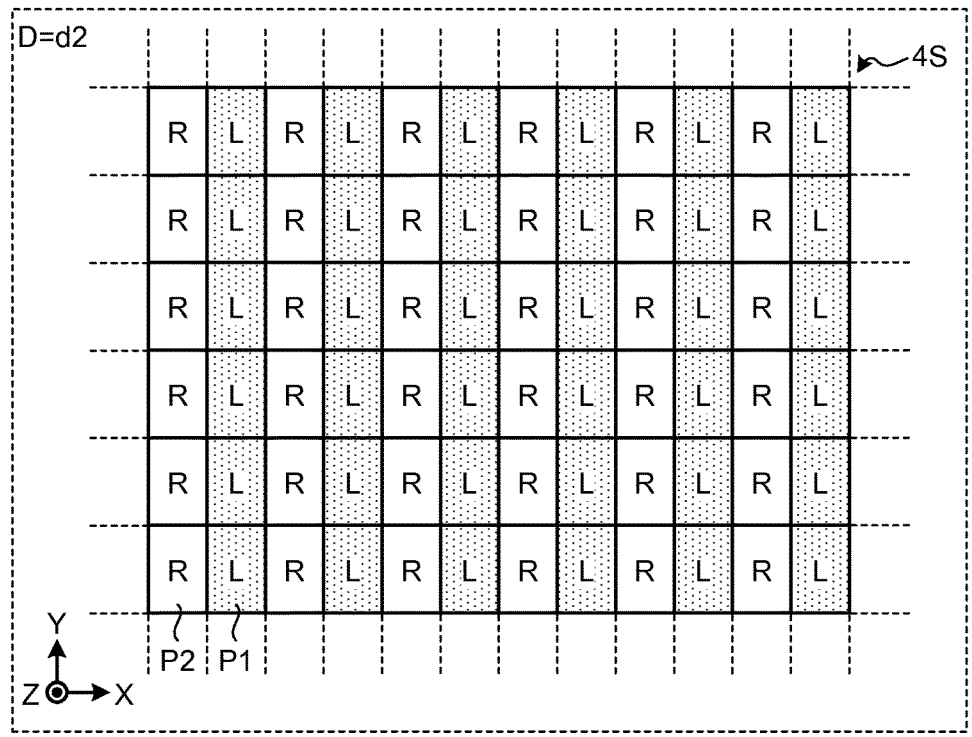

DISPLAY DEVICE AND METHOD FOR MANUFACTURING THE SAME

CROSS REFERENCES TO RELATED APPLICATIONS

The present application claims priority to Japanese Priority Patent Application JP 2013-272144 filed in the Japan Patent Office on Dec. 27, 2013, the entire content of which is hereby incorporated by reference.

BACKGROUND

1. Technical Field

The present disclosure relates to a display device that displays an image and a method for manufacturing the display device.

2. Description of the Related Art

Various display devices such as liquid crystal displays, plasma display devices, and organic electroluminescence (EL) displays have been developed from display quality or power consumption point of view. The display devices have been applied to various electronic apparatuses such as stationary display devices, mobile phones, and mobile information terminals in accordance with the characteristics of the respective display devices.

Some display devices display stereoscopic images using binocular parallax of human eyes. An example of such display devices is a display device that employs an eye tracking in which positions of the user's eyes is detected and controls stereoscopic images using a parallax barrier method on the basis of the tracking result.

Refer to Japanese Patent Application Laid-open Publication No. 2005-157033, for example.

In the display device employing such an eye tracking using the parallax barrier method, a change in brightness in the tracking may be visually recognized as a flicker in some cases. The cause of the flicker is a difference between a rising speed and a falling speed of a liquid crystal.

For the foregoing reasons, there is a need for a display device that can reduce the flicker and a method for manufacturing the display device.

SUMMARY

According to an aspect, a display device includes: a display unit that displays an image; a parallax adjuster that includes a plurality of unit areas; a controller that detects positions of a right eye and a left eye of a user on the basis of a photographic image of the user, determines a pixel display of pixels of a right eye image and a left eye image that are displayed on the display unit, in accordance with the detected positions of the right eye and the left eye, and sets a light transmission state to the unit areas included in the parallax adjuster in accordance with the positions of the right eye and the left eye and the pixel display; a plurality of conductors that are provided corresponding to the respective unit areas and each of which applies a signal to set the light transmission state of the unit area to the corresponding unit area; and a coupling unit that electrically couples the conductors together, the coupling unit providing a certain resistance value between the conductors.

According to another aspect, a method for manufacturing a display device includes: forming a display unit that displays an image; forming a parallax adjuster including a plurality of unit areas each of which is set to a light transmission state in accordance with positions of the right and the left eyes and a pixel display of pixels of a right eye image and a left eye image that are displayed on the display unit, and forming a coupling unit that electrically couples a plurality of electrical elements provided corresponding to the respective unit areas of the parallax adjuster, each of the electrical elements applying a signal to set the light transmission state to a corresponding unit area, the coupling unit providing a certain resistance value between the electrical elements.

Additional features and advantages are described herein, and will be apparent from the following Detailed Description and the figures.

BRIEF DESCRIPTION OF THE FIGURES

FIG. 12 is a diagram illustrating an example of a change, which is performed by the controller, in the pixel display of the pixels of the right eye image and the left eye image;

DETAILED DESCRIPTION

Figure 1:
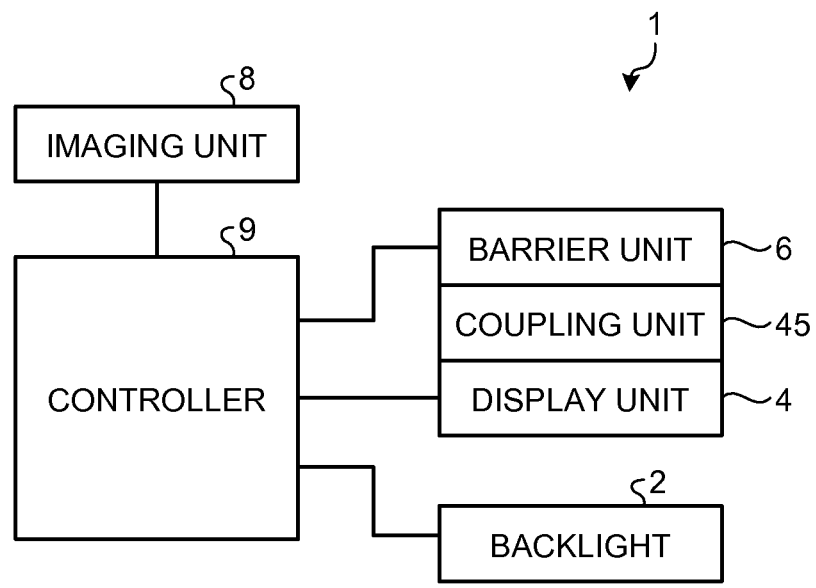
FIG. 1 is a block diagram illustrating an example of a structure of a display device.

The following describes an embodiment and modifications of the present disclosure with reference to the accompanying drawings. The disclosure is just an example. All modifications and changes that may be readily envisaged by those skilled in the art within the spirit of the invention are included in the scope of the invention. To explain more clearly, in the drawings, the widths, thicknesses, and shapes of respective elements may be more schematically illustrated than the actual ones. Each drawing is just an example and does not limit the interpretation of the invention. In the present specification and each drawing, the same elements already described in the previous drawings are denoted by the same reference characters and the detailed description thereof may be omitted.

The description will be made in the following order.
1. Embodiment (display device)
2. Application examples

1. EMBODIMENT

A display device according to an embodiment is applicable to a display device that displays a three-dimensional image by controlling a barrier unit layered on a display unit, for example. Examples of the display unit of the display device include a liquid crystal display (LCD) panel, and micro electro mechanical systems (MEMS).

The display device according to the embodiment is applicable to both of a display device for displaying a monochrome image and a display device for displaying a color image. When the display device is applied to the display device for displaying a color image, a pixel (unit pixel), which is a unit for forming a color image, includes a plurality of sub pixels. Specifically, in the display device that displays a color image, one pixel includes three sub pixels, i.e., a sub pixel that displays red (R), a sub pixel that displays green (G), and a sub pixel that displays blue (B), for example.

The pixel is not limited to the combination of sub pixels of three primary colors of RGB. The pixel can be composed by further adding a sub pixel of another color or sub pixels of a plurality of colors to the sub pixels of the three primary colors of RGB. More specifically, the pixel can be composed by adding, to the sub pixels of RGB, the sub pixel that displays white (W) for improving brightness or by adding, to the sub pixels of RGB, at least one sub pixel that displays a complementary color for extending a color reproduction range, for example.

Structure

Figure 2:
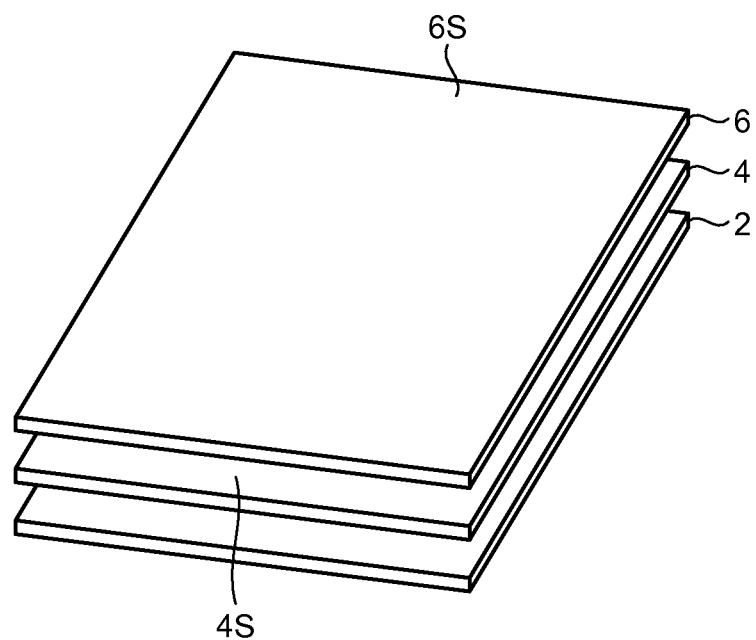
FIG. 2 is a perspective view illustrating an example of a structure of a backlight, a display unit, and a barrier unit of the display device.
Figure 3:
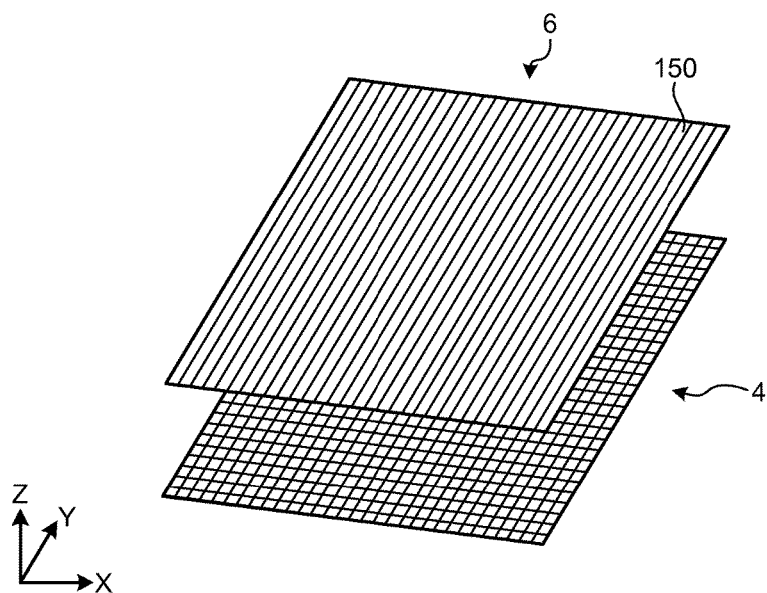
FIG. 3 is a perspective view illustrating a relation between pixels of a display unit and unit areas of a barrier unit.

FIG. 1 is a block diagram illustrating an example of a functional structure of the display device according to the embodiment. FIG. 2 is a perspective view illustrating an example of a structure of a backlight, the display unit, and the barrier unit of the display device illustrated in FIG. 1. FIG. 3 is a perspective view illustrating a relation between the pixels of the display unit and unit areas of the barrier unit. FIGS. 2 and 3 are schematic diagrams, in which the dimensions and shapes are not always the same as those of actual ones. A display device 1 illustrated in FIG. 1 is an example of the display device of the present disclosure. A barrier unit 6 illustrated in FIG. 1 is an example of a parallax adjuster of the present disclosure.

The display device 1 displays an image in such a manner that a user who views a screen from a certain location can recognize the image as a three-dimensional image by the user's naked eyes, for example. As illustrated in FIG. 1, the display device 1 includes a backlight 2, a display unit 4, a coupling unit 45, the barrier unit 6, an imaging unit 8, and a controller 9. The display device 1 includes the backlight 2, the display unit 4, and the barrier unit 6 in such a manner that they are layered in this order, for example.

The backlight 2 is a lighting device that emits planar light toward the display unit 4. The backlight 2 has a light source and a light guide plate, for example. The light guide plate scatters light emitted from the light source and scattered light is emitted from an emission surface facing the display unit 4.

The display unit 4 displays an image. As illustrated in FIG. 3, the display unit 4 is a liquid crystal panel in which a large number of pixels are arranged in a two-dimensional array. Light emitted from the backlight 2 is incident on the display unit 4. The display unit 4 displays an image on a display surface 4S illustrated in FIG. 2 by switching a transmission state and a blocking state of light incident on each pixel.

The coupling unit 45 electrically couples a plurality of conductors provided corresponding to the respective unit areas included in the barrier unit 6, by providing a certain resistance value between the conductors. For example, a sealant having a certain resistance value may be used as the coupling unit 45, and the sealant may electrically couple unit area electrodes of the barrier unit 6. In this case, the unit area electrodes serve as the conductors. The sealant seals a liquid crystal which makes contact with a plurality of signal lines corresponding to a plurality of electrodes corresponding to the unit areas of the barrier unit 6 and is injected in a space corresponding to the unit areas. For another example, a wiring line having a certain resistance value may be used as the coupling unit 45, and the wiring line may electrically couple the signal lines provided corresponding to the respective unit areas of the barrier unit 6. In this case, the signal lines serve as the conductors.

The barrier unit 6 is disposed above the display surface 4S (refer to FIG. 2), on which an image is displayed, of the display unit 4, i.e., above a surface opposite the surface facing the backlight 2. In the following description, a direction along which unit areas 150 are arranged is defined as a first direction, a direction along which the respective unit areas 150 extend is defined as a second direction, and a direction orthogonal to both of the first and the second directions is defined as a third direction. As illustrated in FIG. 3, the plurality of unit areas 150 extending in the second direction are arranged in rows in the first direction orthogonal to the second direction in the barrier unit 6. The barrier unit 6 is a liquid crystal panel, for example. The liquid crystal is oriented by a voltage selectively applied to light transmission areas and light blocking areas. Such an operation causes the barrier unit 6 to switch between a transmission state where light incident on the respective unit areas 150 is allowed to pass to a surface on the light emission side (e.g., a surface 6S illustrated in FIG. 2) and a blocking state where the light incident on the respective unit areas 150 is blocked. As a result, the barrier unit 6 adjusts the light transmission areas that allow an image displayed on the display unit 4 to pass through and the light blocking areas that block an image displayed on the display unit 4, in the first direction. In the embodiment, the barrier unit 6 is an example of the parallax adjuster.

The imaging unit 8 takes an image. A camera may be used as the imaging unit 8, for example. The display device 1 that displays a three-dimensional image by controlling the barrier unit 6 uses what is called a head tracking technique or an eye tracking technique. The head tracking and the eye tracking techniques use a technique in which an image of a user is taken by the imaging unit 8 and positions of eye balls of the user in the image is detected or measured.

The controller 9 controls operations of the respective components of the display device 1. Specifically, the controller 9 controls turning on and off of the backlight 2, and controls light quantity and light intensity of the backlight 2 when the backlight 2 is lit. The controller 9 also controls images to be displayed on the display unit 4, the operations (light transmission and light blocking) of the respective unit areas 150 of the barrier unit 6, and an imaging operation of the imaging unit 8. The controller 9 controls the image to be displayed on the display unit 4 and the operations (light transmission and light blocking) of the respective unit areas 150 of the barrier unit 6 to display a three-dimensional image. The controller 9 in the embodiment is an example of a controller.

The controller 9 is a computer that includes a central processing unit (CPU) serving as an arithmetic device and a memory serving as a storage device, for example. The controller 9 can also achieve various functions by executing a computer program using those hardware resources. Specifically, the controller 9 reads the computer program stored in a certain storage unit (not illustrated), loads the computer program on a memory, and causes the CPU to execute commands included in the program loaded on the memory. In accordance with the implementation results of the commands done by the CPU, the controller 9 controls turning on and off of the backlight 2, light quantity and light intensity when the backlight 2 is lit, the images to be displayed on the display unit 4, and the operations (light transmission and light blocking) of the respective unit areas 150 of the barrier unit 6.

The following describes the display of a three-dimensional image by the controller 9 in the embodiment. The controller 9 detects positions of the user's right and left eyes on the basis of the image taken by the imaging unit 8. The controller 9 determines a pixel display that represents display contents of the pixels of a right eye image and a left eye image that are displayed on the display unit 4, in accordance with the positions of the user's right and left eyes and a distance between the display device 1 and the positions of the right and the left eyes. Subsequently, the controller 9 determines unit areas 150 that allow light to pass through and unit areas 150 that block light out of the unit areas 150 of the barrier unit 6 in accordance with the positions of the user's right and left eyes and the pixel display. The controller 9 controls transmission of light in the barrier unit 6 such that the right eye image is visually recognized by the user's right eye and the left eye image is visually recognized by the user's left eye through the unit areas 150 of the barrier unit 6. In this way, the display device 1 displays an image that the user visually recognizes in a three-dimensional manner.

Display Unit and Barrier Unit

Figure 4:
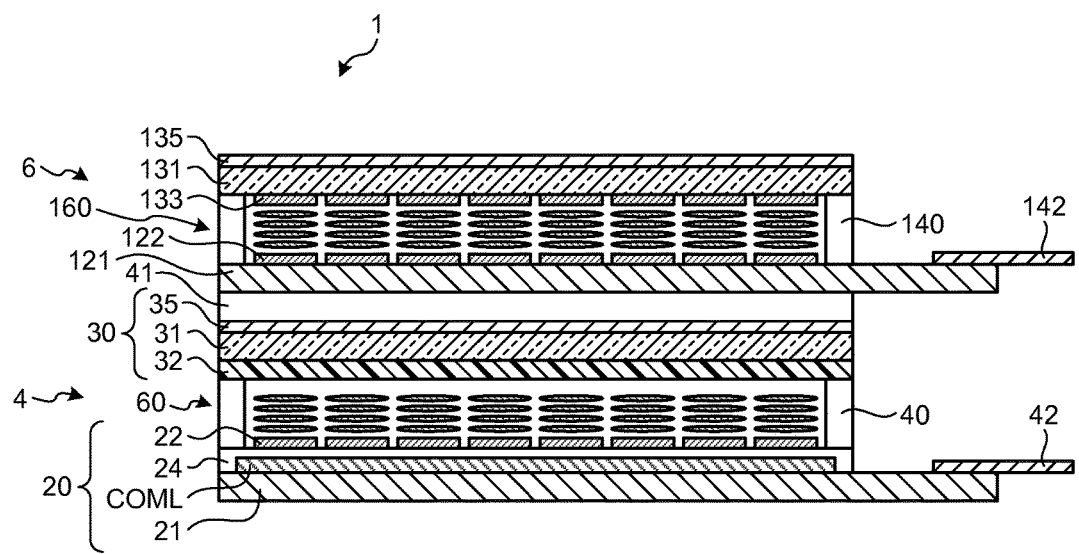
FIG. 4 is a cross-sectional view illustrating a schematic cross-sectional structure of a module in which the display unit and the barrier unit are built.
Figure 5:
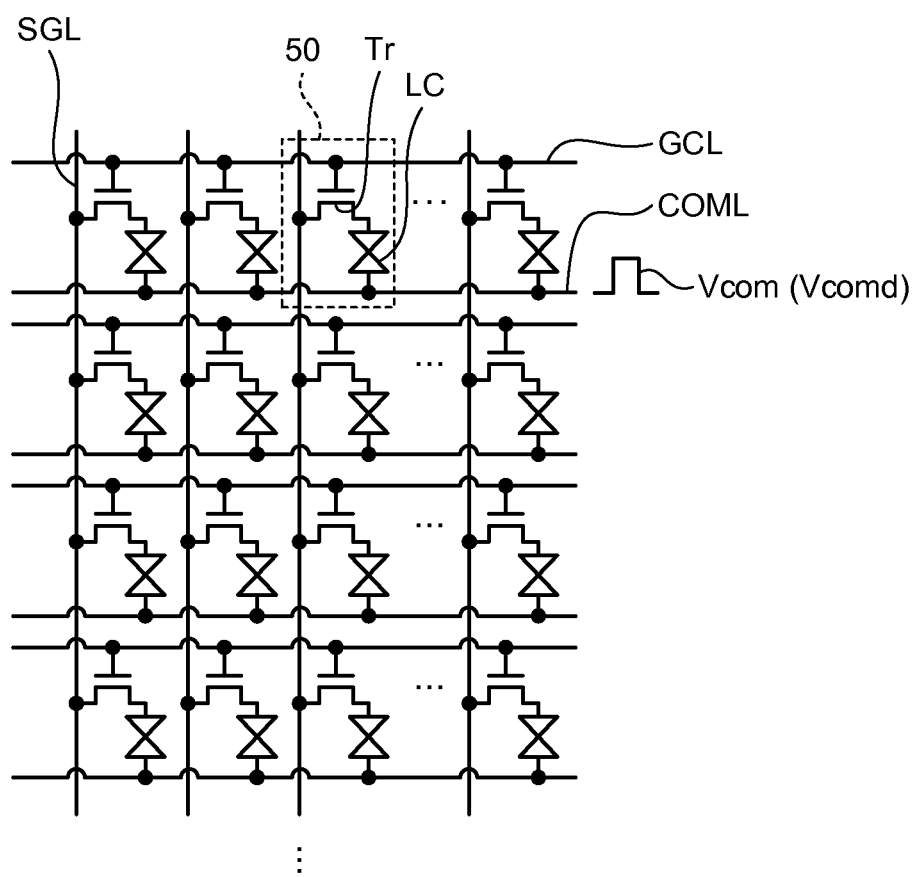
FIG. 5 is a circuit diagram illustrating an example of a pixel array of the display unit.
Figure 6:
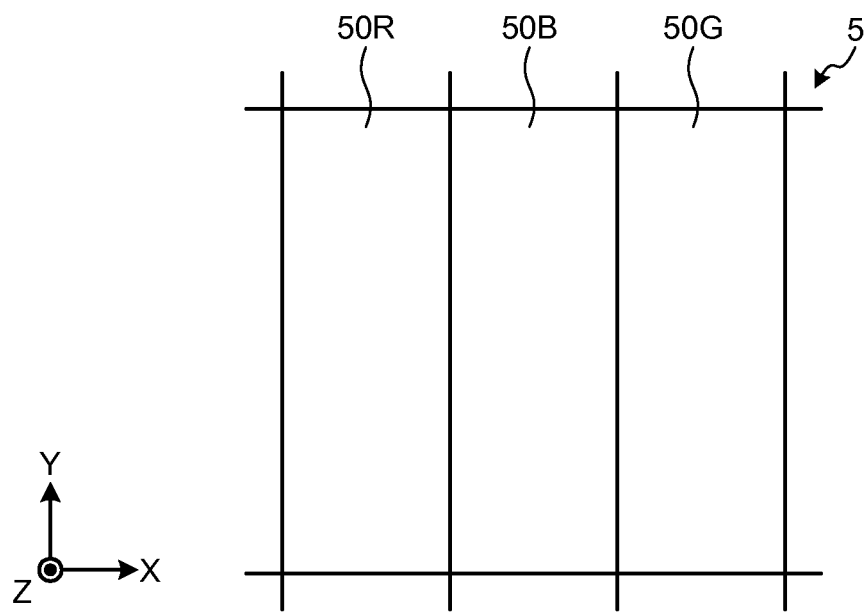
FIG. 6 is a schematic diagram of a pixel in a color display.
Figure 7:
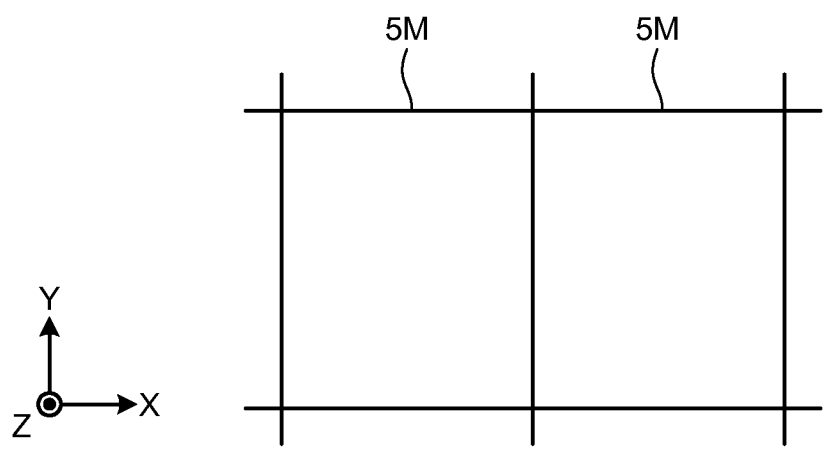
FIG. 7 is a schematic diagram of a pixel in a monochrome display.

The following describes a structural example of the display unit 4 and the barrier unit 6. FIG. 4 is a cross-sectional view illustrating a schematic cross-sectional structure of a module in which the display unit and the barrier unit are built. FIG. 5 is a circuit diagram illustrating the pixel array of the display unit. FIG. 6 is a schematic diagram of the pixel in a color display. FIG. 7 is a schematic diagram of the pixel in a monochrome display.

As illustrated in FIG. 4, the barrier unit 6 is layered above the display unit 4 in the display device 1. In the embodiment, the display unit 4 and the barrier unit 6 are adhesively bonded by an adhesive layer 41 in the display device 1. The display unit 4 includes a pixel substrate 20, a counter substrate 30 disposed facing the pixel substrate 20 in the direction perpendicular to a surface of the pixel substrate 20, and a liquid crystal layer 60 interposed between the pixel substrate 20 and the counter substrate 30.

The pixel substrate 20 includes a TFT substrate 21 serving as a circuit substrate, a plurality of pixel electrodes 22 arranged in a matrix on a surface of the TFT substrate 21, a plurality of common electrodes COML formed between the TFT substrate 21 and the pixel electrodes 22, and an insulation layer 24 that isolates the pixel electrodes 22 and the common electrodes COML. As illustrated in FIG. 5, thin film transistor (TFT) elements Tr of respective pixels 50, and wiring lines, such as pixel signal lines SGL that supply pixel signals to the respective pixel electrodes 22 and scan signal lines GCL that drive the respective TFT elements Tr, are formed on the TFT substrate 21. The pixel signal lines SGL extend on a plane in parallel with the surface of the TFT substrate 21 and supply the pixel signals to the pixels to display images. As illustrated in FIG. 5, the pixel substrate 20 includes the pixels 50 arranged in a matrix. Each pixel 50 includes the TFT element Tr and a liquid crystal LC. In the example illustrated in FIG. 5, the TFT element Tr is an n-channel metal oxide semiconductor (MOS) TFT element. A source of the TFT element Tr is coupled to the pixel signal line SGL, a gate thereof is coupled to the scan line GCL, and a drain thereof is coupled to one end of the liquid crystal LC. One end of the liquid crystal LC is coupled to the drain of the TFT element Tr and the other end thereof is coupled to the common electrode COML.

The pixel 50 is electrically coupled (hereinafter, may be simply described as coupled) to the other pixels of the same row on the pixel substrate 20 by the scan signal line GCL. The scan line GCL is coupled to a gate driver, which supplies a scan signal (Vscan) to the scan line GCL. The pixel 50 is coupled to the other pixels of the same column on the pixel substrate 20 by the pixel signal line SGL. The pixel signal line SGL is coupled to a source driver, which supplies a pixel signal (Vpix) to the pixel signal line SGL. The pixel 50 is coupled to the other pixels of the same column on the pixel substrate 20 by the common electrode COML. A common electrode COML 33 is coupled to a common electrode driver, which supplies a drive signal (Vcom) to the common electrode COML 33. In the example illustrated in FIG. 5, the pixels 50 of the same row share one single common electrode COML.

In the display unit 4, the gate driver applies the scan signal (Vscan) to the gates of the TFT elements Tr of the pixels 50 through the scan signal line GCL illustrated in FIG. 5, and thus one row (one horizontal line) of the pixels 50 arranged in a matrix on the pixel substrate 20 is sequentially selected as a target of display drive. In the display unit 4, the source driver supplies the pixel signal (Vpix) to the pixel 50 through the pixel signal line SGL illustrated in FIG. 5 for each of the pixels 50 included in one horizontal line sequentially selected. The pixels 50 perform a display of one horizontal line in accordance with the supplied pixel signals (Vpix). In the display unit 4, the drive signal (Vcom) is applied to the common electrode COML to drive the common electrode COML.

As described above, one horizontal line is sequentially selected by line sequentially scanning the scan signal lines GCL in a time-division manner in the display unit 4. The display unit 4 performs the display operation horizontal line by horizontal line by supplying the respective pixel signals (Vpix) to the corresponding pixels 50 included in one horizontal line. When the display operation is performed, the display unit 4 applies the drive signal (Vcom) to the common electrode COML horizontal line by horizontal line.

Referring back to FIG. 4, the counter substrate 30 includes a glass substrate 31 and a color filter 32 formed on one surface of the glass substrate 31. A polarizing plate 35 is disposed on the other surface of the glass substrate 31. On a surface opposite the surface on the glass substrate 31 side of the polarizing plate 35, the barrier unit 6 is adhesively bonded by the adhesive layer 41.

The color filter 32 is composed of color filters that are arranged in a periodic manner, and each of which is colored in one of three colors of red (R), green (G), and blue (B), for example. A set of three colors of R, G, and B corresponds to each pixel 50 illustrated in FIG. 5. Specifically, as illustrated in FIG. 6, a unit pixel 5, which is the pixel serving as the unit component of a formed color image, includes a plurality of sub pixels, for example. In the example, the unit pixel 5 includes a sub pixel 50R that displays R, a sub pixel 50B that displays B, and a sub pixel 50G that displays G. The sub pixels 50R, 50B, and 50G included in the unit pixel 5 are arranged in the X direction, i.e., the row direction of the display device 1. The color filter 32 faces the liquid crystal layer 60 in the direction perpendicular to the surface of the TFT substrate 21. The combination of colors of the color filter 32 may differ from this example as long as the filters are colored in different colors.

The unit pixel 5 may further include a sub pixel of another color or sub pixels of different colors. As illustrated in FIG. 7, which illustrates a case where the display unit 4 performs only a monochrome display, a unit pixel 5M, which is the pixel serving as the unit component of a formed monochrome image, corresponds to the pixel 50 (sub pixel in a color image). The unit pixel 5 is the unit for displaying a color image, while the unit pixel 5M is the unit for displaying a monochrome image.

The common electrode COML functions as a common drive electrode (counter electrode) of the display unit 4. In the embodiment, the common electrode COML is a platy electrode in common with the pixel electrodes 22. The common electrode COML may be disposed such that the common electrode COML corresponds to the pixel electrodes 22 included in one row. The common electrode COML faces the pixel electrodes 22 in the direction perpendicular to the surface of the TFT substrate 21 and extends in the direction in parallel with the extending direction of the pixel signal lines SGL. The drive electrode driver applies a drive signal having an alternating-current rectangular waveform to the common electrode COML. The TFT substrate 21 and the color filter 32 are adhesively bonded by a sealant 40.

The liquid crystal layer 60 modulates light passing through the liquid crystal layer 60 in accordance with a state of an electric field. The liquid crystal layer 60 uses a liquid crystal of a lateral electric field mode such as a fringe field switching (FFS) mode or an in-plane switching (IPS) mode, for example. The liquid crystal is not limited to the example. A liquid crystal of a vertical electric field mode may also be used. Liquid crystals of various modes such as a twisted nematic (TN) mode, a vertical alignment (VA) mode, and an electrically controlled birefringence (ECB) mode may be used.

Orientation films are disposed between the liquid crystal layer 60 and the pixel substrate 20, and between the liquid crystal layer 60 and the counter substrate 30. An incident-side polarizing plate is disposed on the lower surface side of the pixel substrate 20.

The barrier unit 6 includes a substrate 121, a plurality of unit area electrodes 122 disposed on the substrate 121 in rows, a glass substrate 131, a plurality of drive electrodes 133 disposed on the unit area electrode 122 side of the glass substrate 131, and a polarizing plate 135 disposed on a surface on the other side of the glass substrate 131. The drive electrode 133 may be a platy electrode in common with the pixel electrodes 122.

The liquid crystal layer 160 is filled in a portion interposed between the surface on the drive electrode 133 side of the glass substrate 131 and the surface on the unit area electrode 122 side of the substrate 121. The liquid crystal layer 160 modulates light passing through the liquid crystal layer 160 in accordance with a state of an electric field. In the embodiment, the liquid crystal layer 160 uses liquid crystals of various modes such as a TN mode, a VA mode, and an ECB mode, for example. The liquid crystal is not limited to one in those modes. A liquid crystal of a lateral electric field mode may also be used. For example, a liquid crystal of an FES or an IPS mode may be used. The orientation films are disposed between the liquid crystal layer 160 and the substrate 121 and between the liquid crystal layer 160 and the glass substrate 131. The incident-side polarizing plate may be disposed on the lower surface side, i.e., on the display unit 4 side, of the substrate 121.

The unit area electrode 122 has the same shape as the unit area 150 illustrated in FIG. 3 and is an elongated platy shape extending along the second direction. The unit area electrodes 122 are arranged in rows in the first direction.

The glass substrate 131 and the substrate 121 are adhesively bonded by a sealant 140. The sealant 140, which has conductivity, has a certain resistance value. For example, the sealant 140 having a certain resistance value may be achieved by mixing conductive particles in an insulating sealant.

The sealant 140 is disposed across the signal lines that correspond to the respective unit areas of the barrier unit 6. As a result, the unit area electrodes corresponding to the respective unit areas of the barrier unit 6 are electrically coupled to each other at a certain resistance value. The unit area electrodes are provided corresponding to the respective unit areas. The sealant 140 electrically couples the unit area electrodes, which are a plurality of conductors to each of which a signal for setting a light transmission state of the corresponding unit area is applied, by providing a certain resistance value between the unit area electrodes. The sealant 140 having a certain resistance value electrically couples the adjacent unit area electrodes, thereby making it possible to set the unit area electrode interposed between the two unit area electrodes, to which two different types of voltage values are applied, to intermediate potential of the voltage values.

The sealant 140 may make contact with the drive electrodes 133 that serve as the common electrodes and are provided such that they face the unit area electrodes. In this case, the unit area electrodes are set to intermediate potential by resistive voltage division in a path through the sealant 140 and the drive electrodes 133 serving as the common electrodes. The sealant 140 may include conductive particles mixed at least in portions where the sealant 140 covers the signal lines, and are not required to include the conductive particles mixed in the whole of the sealant. The sealant 140 in the embodiment is an example of a coupling unit.

The display unit 4 and the barrier unit 6, which are structured as described above, cause an image that a user visually recognizes in a three-dimensional manner to be displayed by switching voltages applied to the pixel electrodes 22 and the unit area electrodes 122 on the basis of signals from the controller 9.

Control Method by Controller

Figure 8:
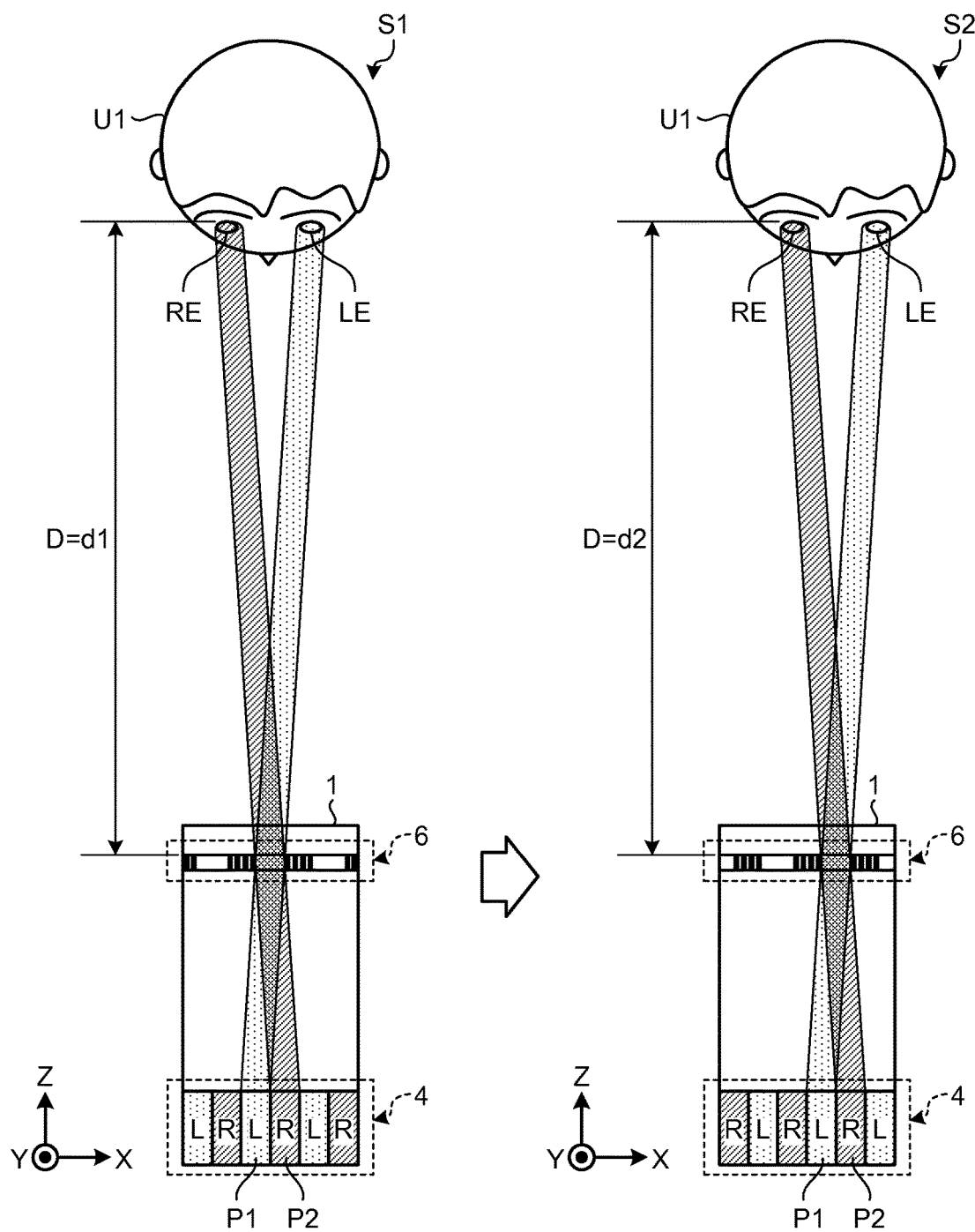
FIG. 8 is a diagram illustrating a concept of a control method by a controller.
Figure 9:
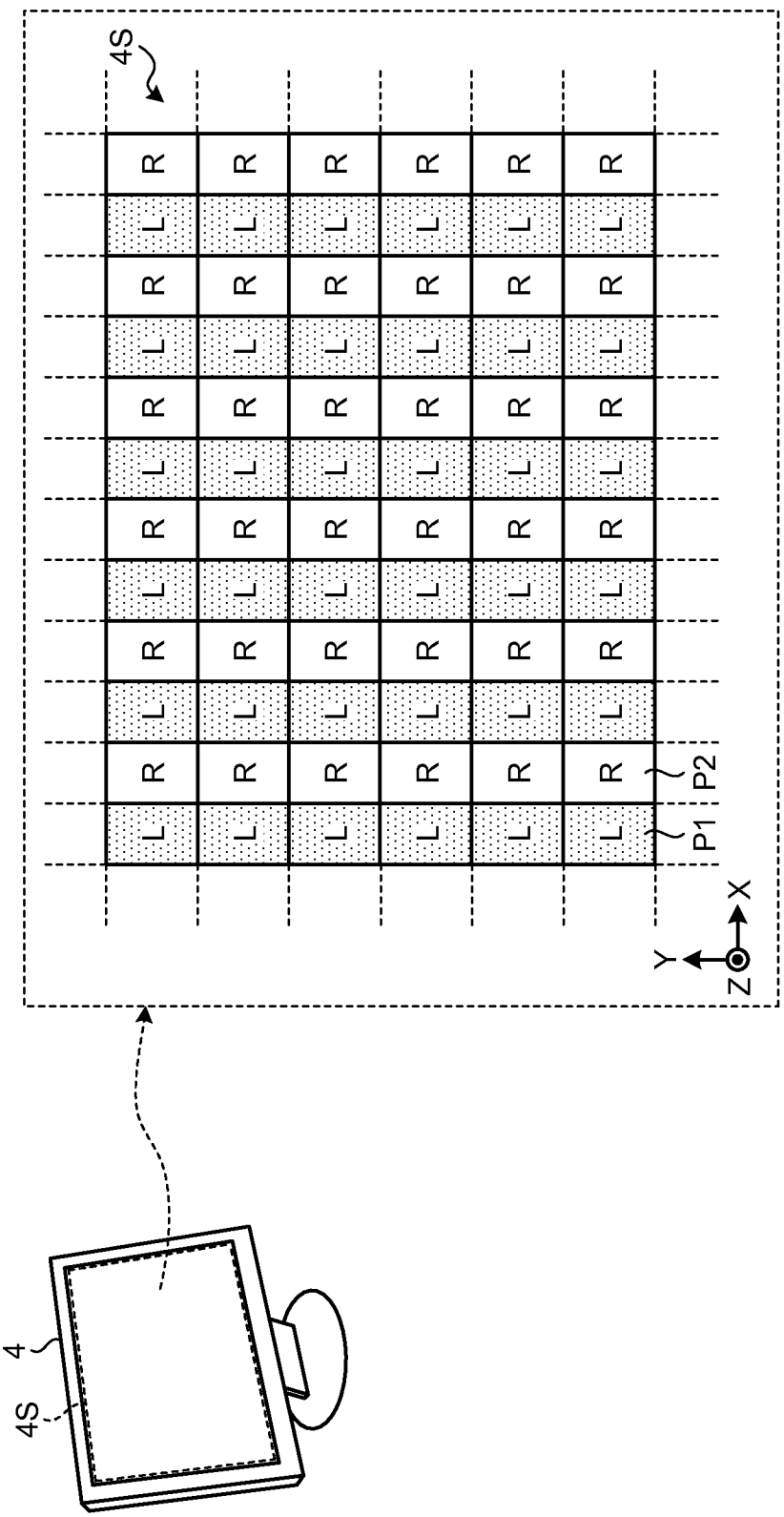
FIG. 9 is a diagram illustrating an example of a pixel display of the pixels of a right eye image and a left eye image, which images are displayed on the display unit.
Figure 10:
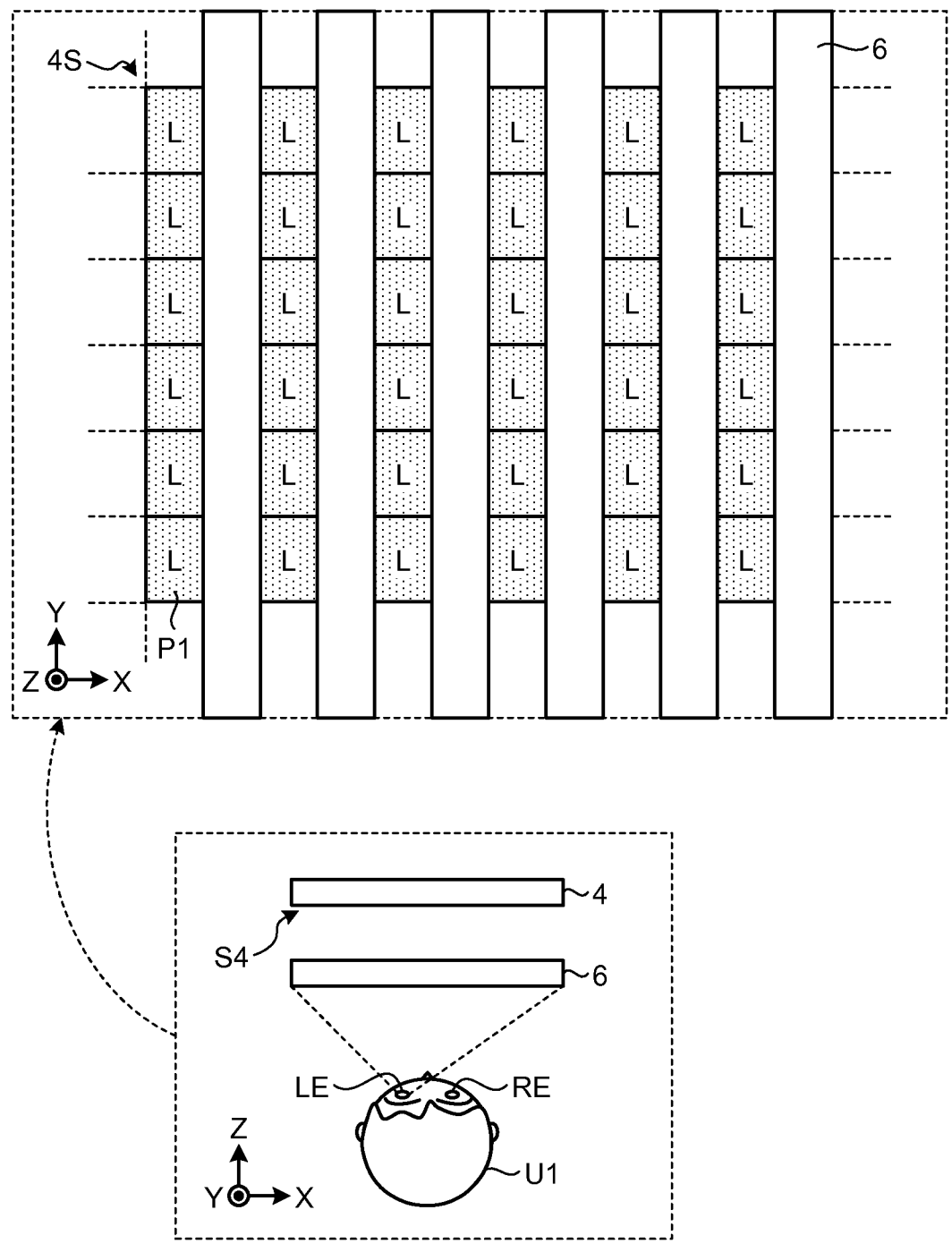
FIG. 10 is a diagram illustrating a part of a visual recognition area visually recognized by the user's left eye.
Figure 11:
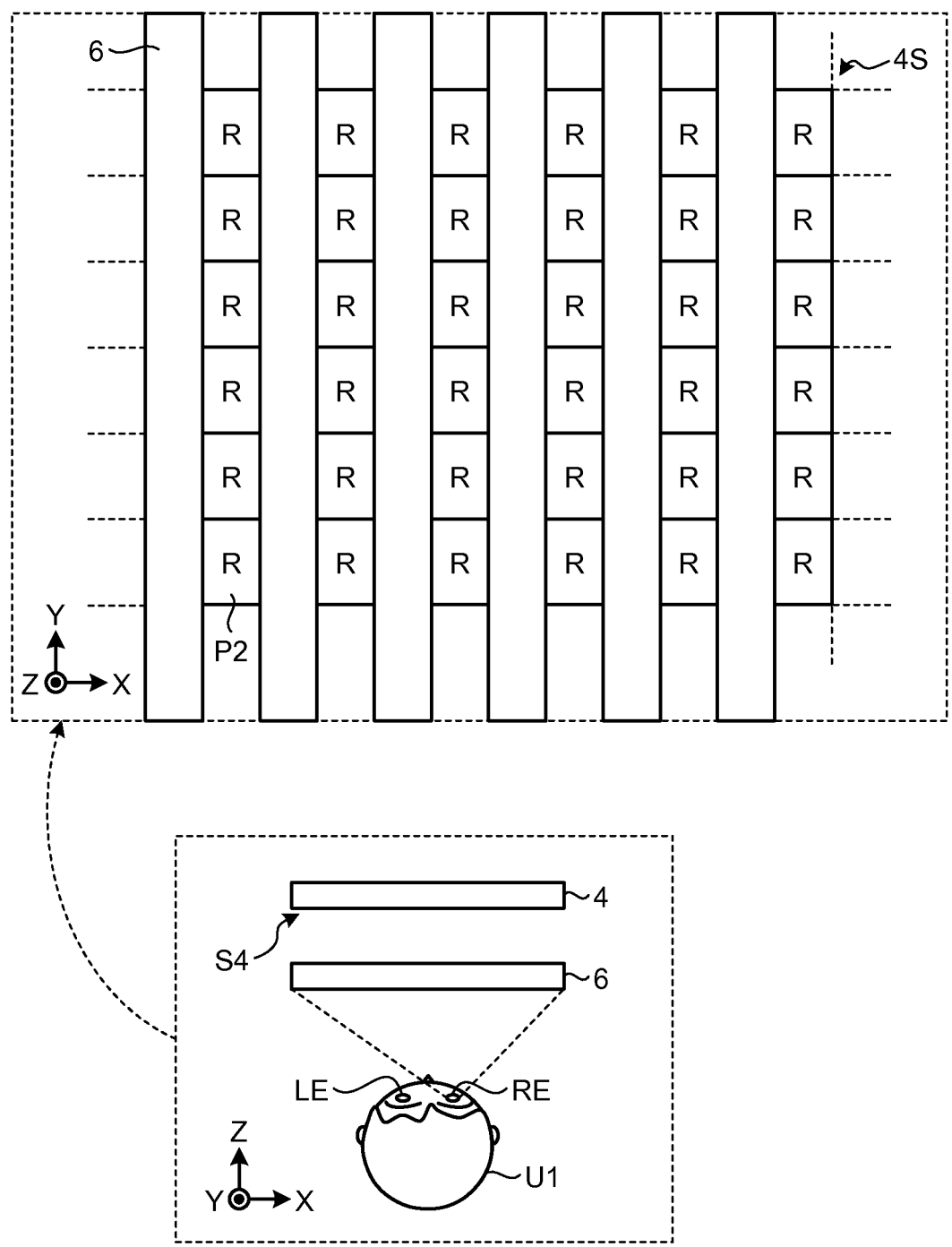
FIG. 11 is a diagram illustrating a part of a visual recognition area visually recognized by the user's right eye.

The following specifically describes a control method by the controller 9 with reference to FIGS. 8 to 12. FIG. 8 is a diagram illustrating a concept of a control method by the controller according to the embodiment. FIG. 9 is a diagram illustrating an example of a pixel display of the pixels of the right eye image and the left eye image, which images are displayed on the display unit. FIG. 10 is a diagram illustrating a part of a visual recognition area visually recognized by the user's left eye. FIG. 11 is a diagram illustrating a part of a visual recognition area visually recognized by the user's right eye. FIG. 12 is a diagram illustrating an example of a change, which is performed by the controller, in the pixel display of the pixels of the right eye image and the left eye image.

The controller 9 detects the positions of the user U1's right and left eyes on the basis of the image of the user taken by the imaging unit 8. Subsequently, the controller 9 calculates a distance between the display device 1 and the positions of the user U1's right and left eyes. The distance between the display device 1 (the barrier unit 6) and the positions of the user U1's right eye RE and left eye LE may be the shortest distance to the barrier unit 6 from the positions of the user U1's right eye RE and left eye LE or a contact distance to the barrier unit 6 in the line of sight of the user U1. The controller 9 preliminary calculates the distance between the display device 1 and the positions of the user U1's right eye RE and left eye LE as a reference distance used for controlling the display unit 4 and the barrier unit 6, when the display device 1 is activated, for example. The reference distance corresponds to the distance between the display device 1 (the barrier unit 6) and the positions of the user U1's right eye RE and left eye LE when the user U1 views an image displayed on the display unit 4, for example. Subsequently, the controller 9 determines the pixel display of the pixels of the right eye image and the left eye image that are displayed on the display unit 4, in accordance with the distance between the display device 1 (the barrier unit 6) and the positions of the user U1's right eye RE and left eye LE. The controller 9 also determines the areas that allow light to pass through (areas that allow light to pass through and areas that block light) out of the unit areas 150 of the barrier unit 6 in accordance with the positions of the user U1's right eye RE and left eye LE and the pixel display.

For example, as illustrated at step S1 in FIG. 8, the controller 9 calculates a distance "D=d1" between the display device 1 and the positions of the user U1's right eye RE and left eye LE. Subsequently, the controller 9 determines the pixel display such that a pixel P1 of the left eye image and a pixel P2 of the right eye image are alternately displayed on the display unit 4 as illustrated at step S1 in FIG. 8, for example, in accordance with the positions of the right eye RE and the left eye LE and the distance that is calculated. In the example illustrated at step S1 in FIG. 8, the pixel P1 of the left eye image and the pixel P2 of the right eye image are alternately displayed. The pixel display is not limited to the example where the pixels are alternately displayed. Any display may be applicable as long as the parallax between the user U1's right eye RE and left eye LE can be maintained. Subsequently, the controller 9 determines the areas that allow light to pass through out of the unit areas 150 of the barrier unit 6 such that the pixels P1 for the left eye LE are visually recognized by the user U1's left eye LE through the barrier unit 6 and the pixels P2 for the right eye RE are visually recognized by the user U1's right eye RE through the barrier unit 6 out of the pixels P1 for the left eye and the pixels P2 for the right eye, the pixels P1 and P2 being alternately displayed on the display unit 4, as illustrated at step S1 in FIG. 8.

At step S1 illustrated in FIG. 8, under the control of the controller 9, as illustrated in FIG. 9, the pixel row of the pixels P1 of the left eye image and the pixel row of the pixel P2 of the right eye image are alternately arranged in the X-axis direction in rows on the display surface 4S of the display unit 4. In the pixel row of the pixels P1, the pixels P1 of the left eye image are displayed in the Y-axis direction. In the pixel row of the pixel P2, the pixels P2 of the right eye image are displayed in the X-axis direction. At step S1 illustrated in FIG. 8, under the control of the controller 9, as illustrated in FIG. 10, the areas that allow light to pass through are determined out of the unit areas 150 of the barrier 6 such that the pixels P1 for the left eye displayed on the display unit 4 are visually recognized by the user U1's left eye LE through the barrier unit 6. Likewise, under the control by the controller 9, as illustrated in FIG. 11, the areas that allow light to pass through are determined out of the unit areas 150 of the barrier 6 such that the pixels P2 for the right eye displayed on the display unit 4 are visually recognized by the user U1's right eye RE through the barrier unit 6.

Subsequently, the controller 9 detects positions of the user U1's right and left eyes, and calculates a distance between the display device 1 and the positions of the user U1's right eye RE and left eye LE. When the calculated distance and the positions of the user U1's right eye RE and left eye LE are different from the distance and the positions of the user U1's right eye RE and left eye LE that are calculated and detected at step S1 respectively, the controller 9 updates the pixel display on the display unit 4 and the light transmission and light blocking operations of the unit areas 150 of the barrier unit 6. The controller 9 changes the pixel display of the pixels of the right eye image and the left eye image that are displayed on the display unit 4, and unit areas 150 that allow light to pass through out of the unit areas 150 of the barrier unit 6 in accordance with the distance between the display device 1 and the positions of the user U1's right eye RE and left eye LE.

For example, as illustrated at step S2 in FIG. 8, the controller 9 detects positions of the user U1's right and left eyes, and calculates a distance "D=d2" between the display device 1 and the positions of the user U1's right eye RE and left eye LE. Subsequently, the controller 9 changes the pixel display of the pixels P1 of the left eye image and the pixels P2 of the right image as illustrated at step S2 in FIG. 8 in accordance with the positions of the right eye RE and the left eye LE and the distance. Subsequently, the controller 9 determines the areas that allow light to pass through out of the unit areas 150 of the barrier unit 6 such that the pixels P2 for the right eye are visually recognized by the user U1's right eye RE through the barrier unit 6 and the pixels P1 for the left eye are visually recognized by the user U1's left eye LE through the barrier unit 6 in accordance with the changed pixel display and the positions of the user U1's right eye RE and left eye LE.

At step S2 illustrated in FIG. 8, under the control of the controller 9, as illustrated in FIG. 12, the pixel display of the pixels of the right eye image and the left eye image that are displayed on the display unit 4, is changed and the unit areas 150 that allow light to pass through are changed out of the unit areas 150 of the barrier unit 6. At step S2 illustrated in FIG. 8, the positions of the pixel row of the pixels P1 of the left eye image and the pixel row of the pixels P2 of the right eye image at step S2 are switched from those at step S1. To switch the positions as described above, under the control of the controller 9, as illustrated in FIG. 12, the areas that allow light to pass through are changed out of the unit areas 150 of the barrier 6 such that the pixels P1 for the left eye displayed on the display unit 4 are visually recognized by the user U1's left eye LE through the barrier unit 6. Likewise, under the control of the controller 9, as illustrated in FIG. 12, the areas that allow light to pass through are changed out of the unit areas 150 of the barrier 6 such that the pixels P2 for the right eye displayed on the display unit 4 are visually recognized by the user U1's right eye RE through the barrier unit 6.

In this way, the controller 9 changes the pixel display of the pixels of the right eye image and the left eye image in accordance with the distance between the display device 1 (the barrier unit 6) and the user U1's right eye RE and left eye LE. The changing the pixel display performed by the controller 9 in accordance with the distance between the display device 1 (the barrier unit 6) and the user U1's right eye RE and left eye LE may be preliminarily implemented and set by calibration at a design stage on the basis of a relation between the position of the display device 1 and the positions of the right eye RE and the left eye LE, or may be implemented at the use stage of the display device 1 by real-time processing.

As described above, the controller 9 determines the unit areas that allow light to pass through such that the right eye image is visually recognized by the user's right eye RE and the left eye image is visually recognized by the user's left eye LE through the unit areas of the barrier unit 6 in accordance with the positions of the user's right eye RE and left eye LE. For example, after changing the pixel display, the controller 9 changes the unit areas that allow light to pass through out of the unit areas of the barrier unit 6 in accordance with the changed pixel display.

Flow of Control by Controller

Figure 13:
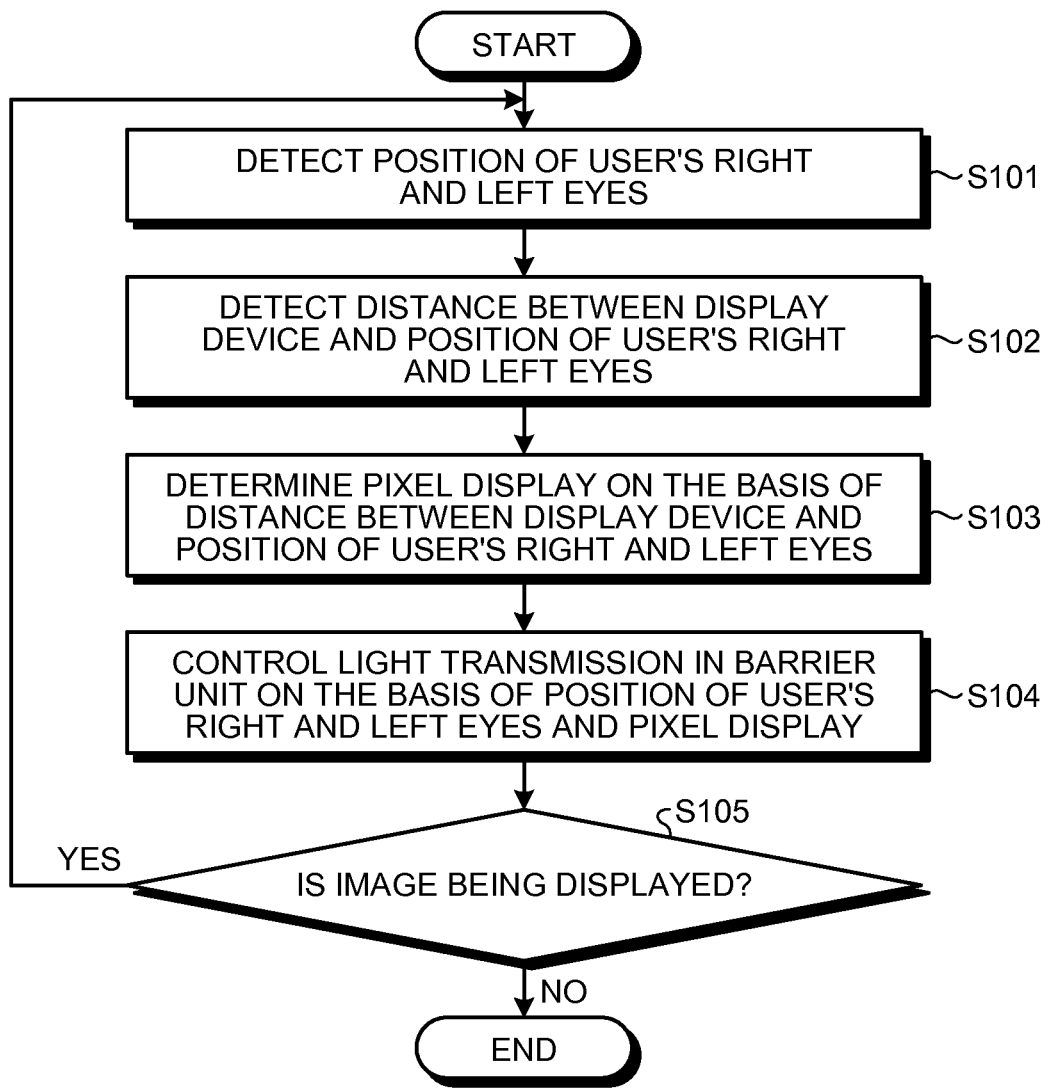
FIG. 13 is a flowchart illustrating a flow of control by the controller.

The following describes a flow of control by the controller 9 according to the embodiment with reference to FIG. 13. FIG. 13 is a flowchart illustrating a flow of control by the controller according to the embodiment. The control illustrated in FIG. 13 is executed when a display of a three-dimensional image starts, for example.

As illustrated in FIG. 13, the controller 9 detects positions of the user's right eye RE and left eye LE on the basis of the image taken by the imaging unit 8 (step S101). The controller 9 calculates a distance between the display device 1 and the positions of the user U1's right eye RE and left eye LE (step S102). The distance between the display device 1 and the positions of the right eye RE and the left eye LE may be the shortest distance to the barrier unit 6 from the positions of the user U1's right eye RE and left eye LE or the contact distance to the barrier unit 6 in the line of sight of the user U1.

The controller 9 determines the pixel display of pixels of the right eye image and the left eye image that are displayed on the display unit 4, on the basis of the positions of the right eye RE and the left eye LE and the distance between the display device 1 and the positions of the right eye RE and the left eye LE (step S103). The controller 9 controls the light transmission and light blocking operations of the barrier unit 6 on the basis of the position of the display device 1, the positions of the right eye RE and the left eye LE, and the pixel display (step S104). In other words, the controller 9 determines the areas that allow light to pass through and the areas that block light out of the unit areas 150 of the barrier unit 6.

The controller 9 determines whether an image is being displayed (step S105). If it is determined that an image is being displayed (Yes at step S105), the controller 9 returns to step S101, and continues to perform the control illustrated in FIG. 13. If it is determined that no image is being displayed (No at step S105), the controller 9 ends the control illustrated in FIG. 13.

Figure 14:
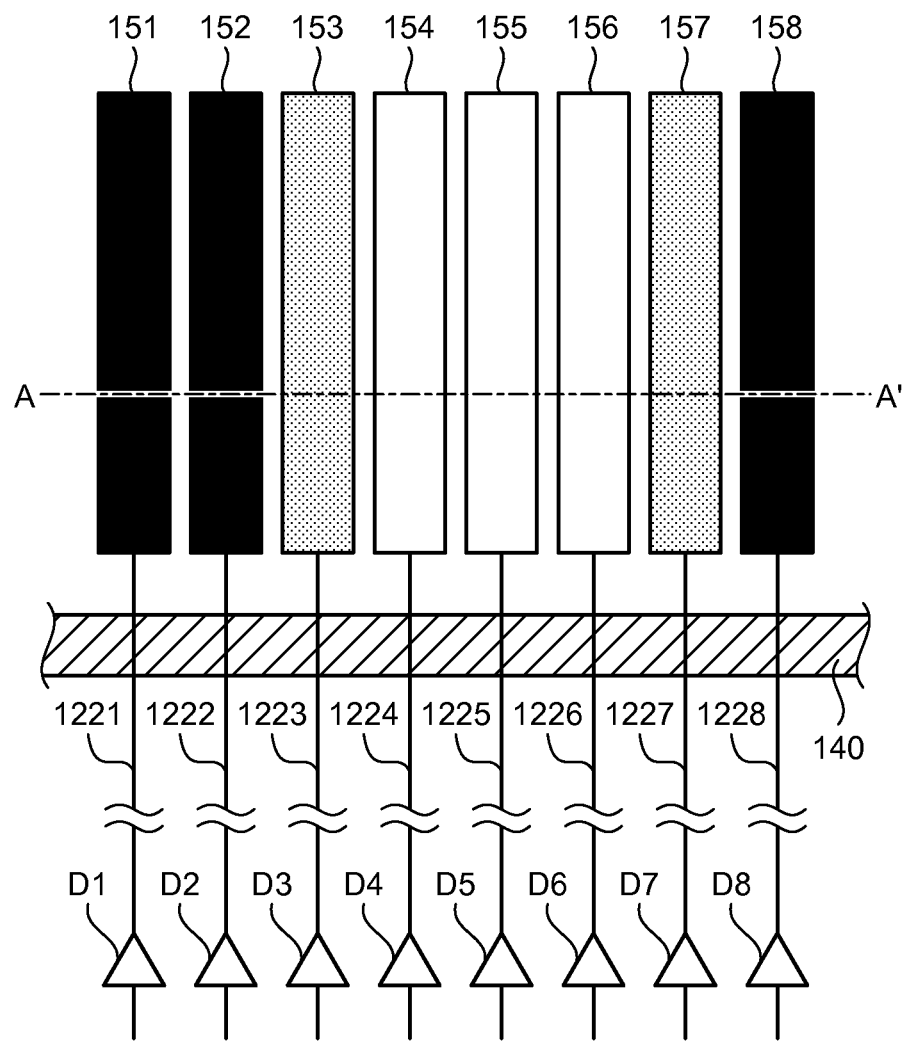
FIG. 14 is a diagram illustrating an example of a structure of the barrier unit.

The following describes a structure of the barrier unit 6 with reference to FIG. 14. FIG. 14 is a diagram illustrating an example of the structure of the barrier unit. The barrier unit 6 includes unit areas. For example, as illustrated in FIG. 14, the barrier unit 6 includes unit areas 151 to 158. In the barrier unit 6, signal lines 1221 to 1228 are provided corresponding to the respective unit areas 151 to 158. The respective signal lines 1221 to 1228 are coupled to the corresponding unit area electrodes 122. The light transmission states of the unit areas 151 to 158 are set by the voltage values applied to the signal lines 1221 to 1228. That is, each of the unit areas 151 to 158 is set to a state in which the unit area allows light to pass through or a state in which the unit area does not allow light to pass through (blocks light) in accordance with the voltage value applied to each of the signal lines 1221 to 1228.

The sealant 140 having a certain resistance value makes contact with the signal lines 1221 to 1228 corresponding to the respective unit areas 151 to 158 across the signal lines 1221 to 1228. The sealant 140 is electrically coupled to the signal lines 1221 to 1228 corresponding to the respective unit areas 151 to 158 that are included in the barrier unit 6. As a result, the sealant 140 electrically couples the unit area electrodes 122, which correspond to the respective unit areas 151 to 158 that are included in the barrier unit 6, providing a certain resistance value between the unit area electrodes 122.

As illustrated in FIG. 14, driver circuits D1 to D8, each of which applies the voltage value, are coupled to the signal lines 1221 to 1228 corresponding to the respective unit areas 151 to 158 that are included in the barrier unit 6. Each of the driver circuits D1 to D8, under the control of the controller 9, selectively outputs a voltage value Vl (e.g., 0 (V)) to set the state in which the unit area allows light to pass through and a voltage Vh (e.g., 5 (V)) to set the state in which the unit area does not allow light to pass through (blocks light). Each of the driver circuits D1 to D8 can also be set to a high impedance state, in which the driver circuit is electrically disconnected, under the control of the controller 9. The driver circuits D1 to D8 may be included in the controller 9 or provided off the display area of the barrier unit 6 (what is called a frame portion). The driver circuit corresponding to the signal line that corresponds to the unit area set to the intermediate potential is preferably set to the high impedance state. Three-state buffers can be used for the driver circuits D1 to D8, for example. The circuits are, however, not limited to the three-state buffers. When the three-state buffer is used, the driver circuits D1 to D8 can be set to the high impedance state by applying a control signal output from the controller 9 to the control terminal of the three-state buffer.

As illustrated in FIG. 14, the driver circuits D1 to D8, each of which applies the voltage value, are coupled to the signal lines 1221 to 1228 corresponding to the respective unit areas 151 to 158 that are included in the barrier unit 6. The voltage Vh to set the state in which the unit area does not allow light to pass through (blocks light) is applied to the unit areas 151, 152, and 158 as the outputs of the driver circuits D1, D2, and D8. The voltage Vl to set the state in which the unit area allows light to pass through is applied to the unit areas 154, 155, and 156 as the outputs of the driver circuits D4, D5, and D6. When the controller 9 sets the driver circuit D3 to the high impedance state, the intermediate potential Vm of the outputs of the driver circuits D2 and D4 is applied to the unit area electrode 122 corresponding to the signal line 1223 because the unit area electrode 122 corresponding to the signal line 1222 and the unit area electrode 122 corresponding to the signal line 1224 are electrically coupled by the sealant 140 interposed therebetween at a certain resistance value. Likewise, when the controller 9 sets the driver circuit D7 to the high impedance state, the intermediate potential Vm of the outputs of the driver circuits D6 and D8 is applied to the unit area electrode corresponding to the signal line 1227 because the unit area electrode corresponding to the signal line 1226 and the unit area electrode corresponding to the signal line 1228 are electrically coupled by the sealant 140 interposed therebetween at a certain resistance value.

In the embodiment, to reduce a difference between a rising speed and a falling speed of the liquid crystal, the intermediate potential is preliminarily applied to the unit area electrode 122 that is disposed between the unit area electrode to which the voltage value Vl is applied to set the state in which the unit area allows light to pass through and the unit area electrode to which the voltage value Vh is applied to set the state in which the unit are does not allow light to pass through (blocks light). By paying attention that the unit area electrode 122 to which the intermediate potential needs to be applied out of the unit area electrodes 122 of the barrier unit 6 is located next to a black display pixel, the adjacent unit area electrodes 122 are electrically coupled by the sealant 140, which has a certain resistance value, interposed therebetween and an effective voltage having a voltage after the voltage drop is applied to the electrode to which the output of the driver circuit is not directly applied.

The sealant 140, which has a certain resistance value, electrically couples the adjacent ones of the signal lines 1221 to 1228, providing a certain resistance value between the adjacent ones. The pixel electrode interposed between two pixel electrodes to which two different voltage values are applied is set to the intermediate potential of the two voltage values by the resistive voltage division based on the resistance value of the sealant 140. The use of the resistance voltage division does not require a preparation of a special voltage source to set the unit area electrode 122 interposed between two unit area electrodes 122 to which two different voltage values are applied to the intermediate potential.

Figure 15:
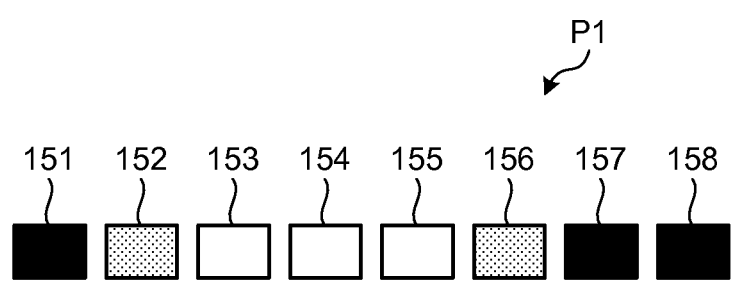
FIG. 15 is a schematic diagram illustrating an example of a cross section of the barrier unit when tracking is performed.
Figure 16:
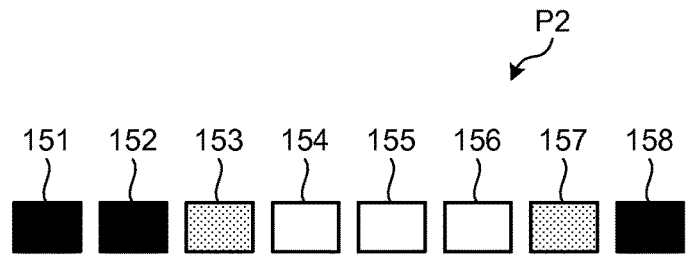
FIG. 16 is a schematic diagram illustrating the example of the cross section of the barrier unit when tracking is performed.
Figure 17:
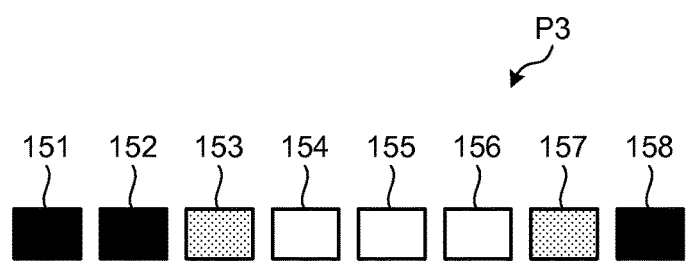
FIG. 17 is a schematic diagram illustrating the example of the cross section of the barrier unit when tracking is performed.

FIGS. 15 to 17 are schematic diagrams each illustrating a cross section of the barrier unit 6 when the tracking is performed in the structure of the embodiment. FIGS. 15 to 17 each schematically illustrate the cross section along line A-A' in FIG. 14, for example. FIGS. 15 to 17 each illustrate the unit areas 151 to 158, which are some of the unit areas included in the barrier unit 6.

With reference to FIGS. 15 to 17, a state P2 in transition from a state P1 to a state P3 will be described below. The state P1 is a state before the tracking. The state P3 is a state after the tracking. The state P2 is a state just after the change in applied voltage. In FIGS. 15 to 17, the unit area to which the voltage value to set the state in which the unit area allows light to pass through is depicted with the outline, the unit area to which the voltage value to set the state in which the unit area does not allow light to pass through (blocks light) is depicted in black, and the unit area that is set to the intermediate potential is depicted hatched.

In the state P1 illustrated in FIG. 15, the voltage Vl (e.g., 0 (V)) to set the state in which the unit area allows light to pass through is applied to the unit areas 153 to 155. In the state P1, the voltage value Vh (e.g., 5 (V)) to set the state in which the unit area does not allow light to pass through (blocks light) is applied to the unit areas 151, 157, and 158.

The unit area electrodes 122 corresponding to the respective unit areas 151 to 158 are coupled to the signal lines making contact with the sealant 140. As a result, the unit area electrode 122 located between the unit area electrode 122 corresponding to the unit area 151 and the unit area electrode 122 corresponding to the unit area 153 is set to intermediate potential Vm of the voltage value (e.g., 0 (V)) to set the state in which the unit area allows light to pass through and the voltage (e.g., 5 (V)) to set the state in which the unit area does not allow light to pass through (blocks light), for example. The intermediate potential is a threshold voltage value (e.g., 3 (V)), for example. Likewise, the intermediate potential is applied to the pixel electrode located between the pixel electrode corresponding to the unit area 155 and the pixel electrode corresponding to the unit area 157.

In the transition from the state P1 illustrated in FIG. 15 to the state P3 illustrated in FIG. 17 through the state P2 illustrated in FIG. 16, both of the unit area electrode 122 corresponding to the unit area 152 and the unit area electrode 122 corresponding to the unit area 156 are set to the intermediate potential Vm in the state P1. As a result, in the state P2 immediately after the state P1, there is almost no difference between a time taken to change the state of liquid crystal due to a change in voltage of the unit area electrode 122 corresponding to the unit area 152 from the intermediate potential Vm to 5 (V), and a time taken to change the state of liquid crystal due to a change in voltage of the unit area electrode 122 corresponding to the unit area 152 from the intermediate potential Vm to 0 (V), for example. Consequently, a change in brightness is smaller as the whole of the display device than that of a comparative example, which is described later, in the transition from the state P1 to the state P3, thereby further reducing the flicker than that of the comparative example.

COMPARATIVE EXAMPLE

Figure 18:
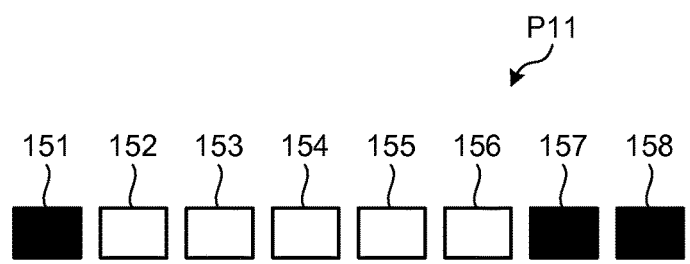
FIG. 18 is a schematic diagram illustrating an example of the cross section of the barrier unit when tracking is performed in a comparative example.
Figure 19:
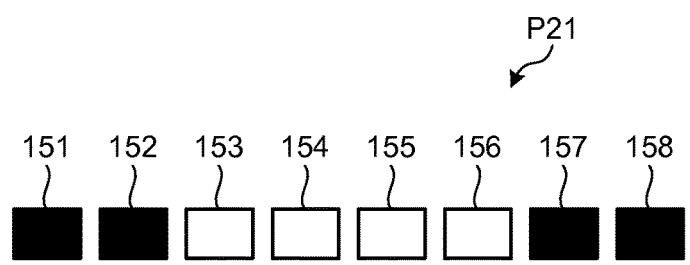
FIG. 19 is a schematic diagram illustrating the example of the cross section of the barrier unit when tracking is performed in the comparative example.
Figure 20:
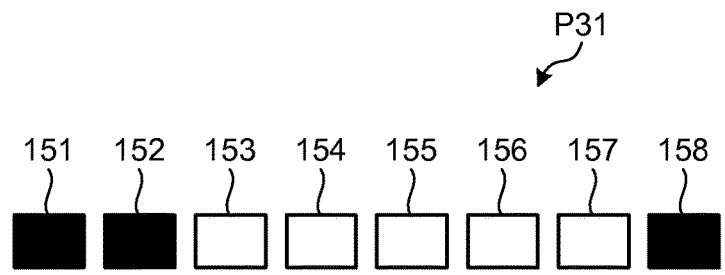
FIG. 20 is a schematic diagram illustrating the example of the cross section of the barrier unit when tracking is performed in the comparative example.

The following describes a comparative example in which the structure of the embodiment is not employed, with reference to FIGS. 18 to 21. FIGS. 18 to 20 are schematic diagrams each illustrating a cross section of the barrier unit when the tracking is performed in the comparative example.

In FIGS. 18 to 20, the unit areas 151 to 158 are in an off state when 0 (V) is applied thereto, for example. The unit areas in the off state are depicted as the outlines thereof in FIGS. 18 to 20. The liquid crystal is in an on state when 5 (V) is applied thereto. The unit areas in the on state are depicted in black in FIGS. 18 to 20.

In a liquid crystal of the vertical electronic field mode (e.g., a TN mode), a speed changing from the on state to the off state (i.e., the falling speed) is slower than a speed changing from the off state to the on state (i.e., the rising speed). Because of the difference in speed, there is a state P21 illustrated in FIG. 19 in the transition from a state P11 illustrated in FIG. 18 to a state P31 illustrated in FIG. 20 when tracking is performed in the display device that employs the eye tracking using the parallax barrier method. In the state P21 illustrated in FIG. 19, the brightness of the whole of the display device is dropped for a moment and the screen becomes dark because the number of unit areas in the off state is small. Thereafter, the state changes to the state P31, thereby causing the brightness of the whole of the display device to recover to the original brightness. Just after the change in screen, the ratio of the display in black to the display area is large, thereby causing a user to perceive the screen as being dark as a whole. Thereafter, the display ratio returns to the original ratio, thereby causing a user to visually recognize the change in brightness as the flicker.

Figure 21:
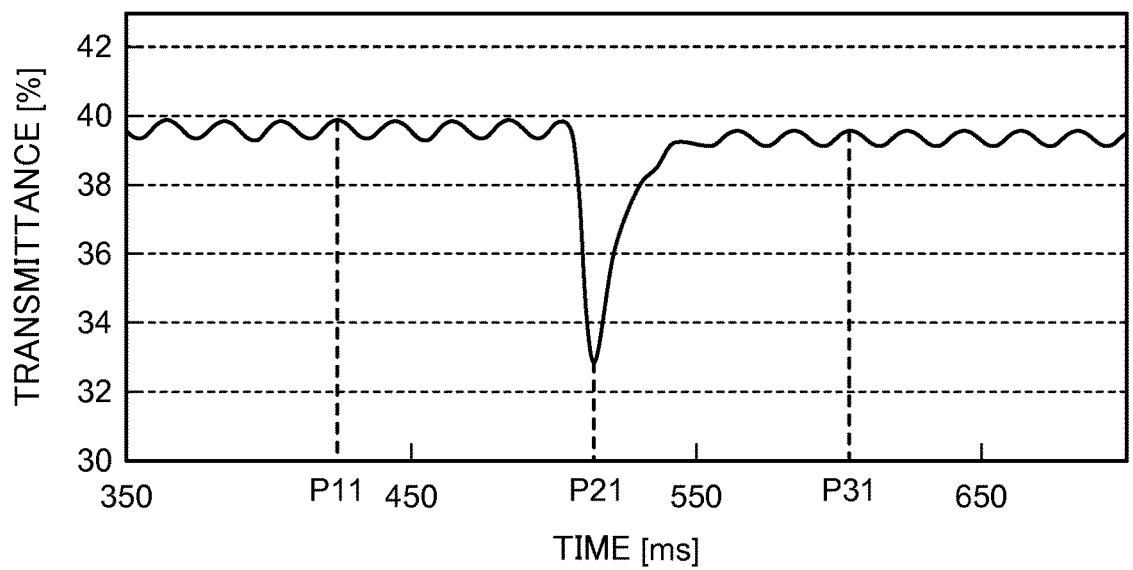
FIG. 21 is a diagram illustrating a measurement example of a change in transmittance of the whole of the display device when tracking is performed in the comparative example.

FIG. 21 is a diagram illustrating a measurement example of a change in transmittance of the whole of the display device when tracking is performed in the comparative example. In FIG. 21, the abscissa axis represents an elapsed time (ms) from the start of the measurement while the vertical axis represents the light transmittance (%). As illustrated in FIG. 21, the transmittance, which is about 40(%) in the state P11 (about 430 (ms) in FIG. 21), is reduced to about 33(%) (about 520 (ms) in FIG. 21) in the state P21, for example. Thereafter, the transmittance recovers to about 40(%) in the state P31 (about 600 (ms) in FIG. 21), for example. When the transmittance rapidly drops and thereafter recovers within a period of time of about 170 (ms) in this way, the change in brightness is visually recognized as the flicker.

In contrast with the comparison example, in the embodiment, the unit area located between the unit area to which the voltage corresponding to the on state is applied and the unit area to which the voltage corresponding to the off state is applied is set to the intermediate potential of the two voltage values each applied to the corresponding unit area. As a result, the drop in brightness is small in the transition from the state P1 to the state P3. Consequently, the flicker is not visually recognized or the flicker is reduced.

First Modification

Figure 22:
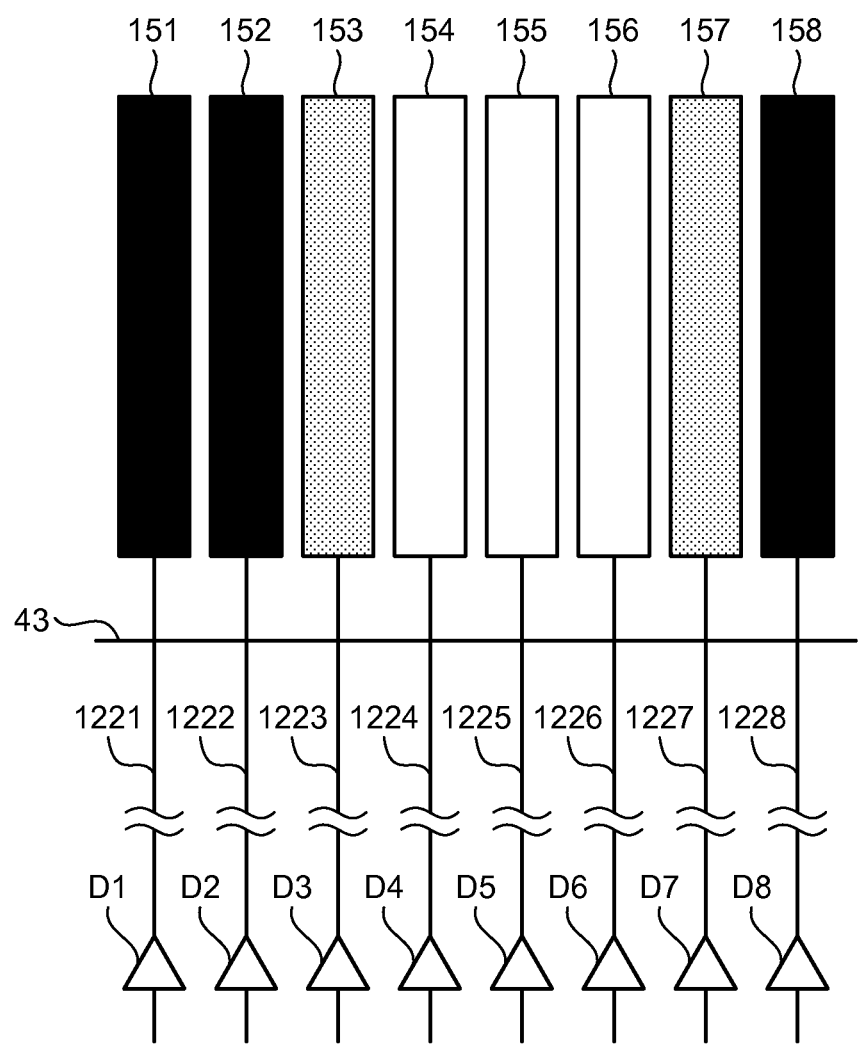
FIG. 22 is a diagram illustrating a first modification of a coupling unit that couples signal lines together.

FIG. 22 is a diagram illustrating a first modification of the coupling unit. In the first modification illustrated in FIG. 22, a wiring line 43 provided across the signal lines 1221 to 1228 serves as the coupling unit instead of the sealant 140. The signal lines 1221 to 1228 are provided corresponding to the respective unit areas of the barrier unit 6.

The wiring line 43, which has a certain resistance value, electrically couples the adjacent ones of the signal lines 1221 to 1228, providing a certain resistance value between the adjacent ones. The voltage to set the state in which the unit area does not allow light to pass through (blocks light) is applied to the unit areas 151, 152, and 158 as the outputs of the driver circuits D1, D2, and D8. The voltage to set the state in which the unit area allows light to pass through is applied to the unit areas 154, 155, and 156 as the outputs of the driver circuits D4, D5, and D6. When the controller 9 sets the driver circuit D3 to the high impedance state, the intermediate potential of the outputs of the driver circuits D2 and D4 is applied to the signal line 1223 because the signal lines 1222 and 1224 are coupled by the wiring line 43. Likewise, when the controller 9 sets the driver circuit D7 to the high impedance state, the intermediate potential of the outputs of the driver circuits D6 and D8 is applied to the signal line 1227 because the signal lines 1226 and 1228 are coupled by the wiring line 43.

The signal line interposed between two signal lines to which two different voltage values are applied is set to the intermediate potential of the two voltage values by the resistance value of the wiring line 43. As a result, it is not required to prepare a special voltage source to set the intermediate potential. The first modification using the wiring line 43 also operates in the same manner as described with reference to FIGS. 15 to 17. As a result, a change in brightness of the whole of the display device is smaller than that of the comparative example, thereby further reducing the flicker than that of the comparative example.

Second Modification

Figure 23:
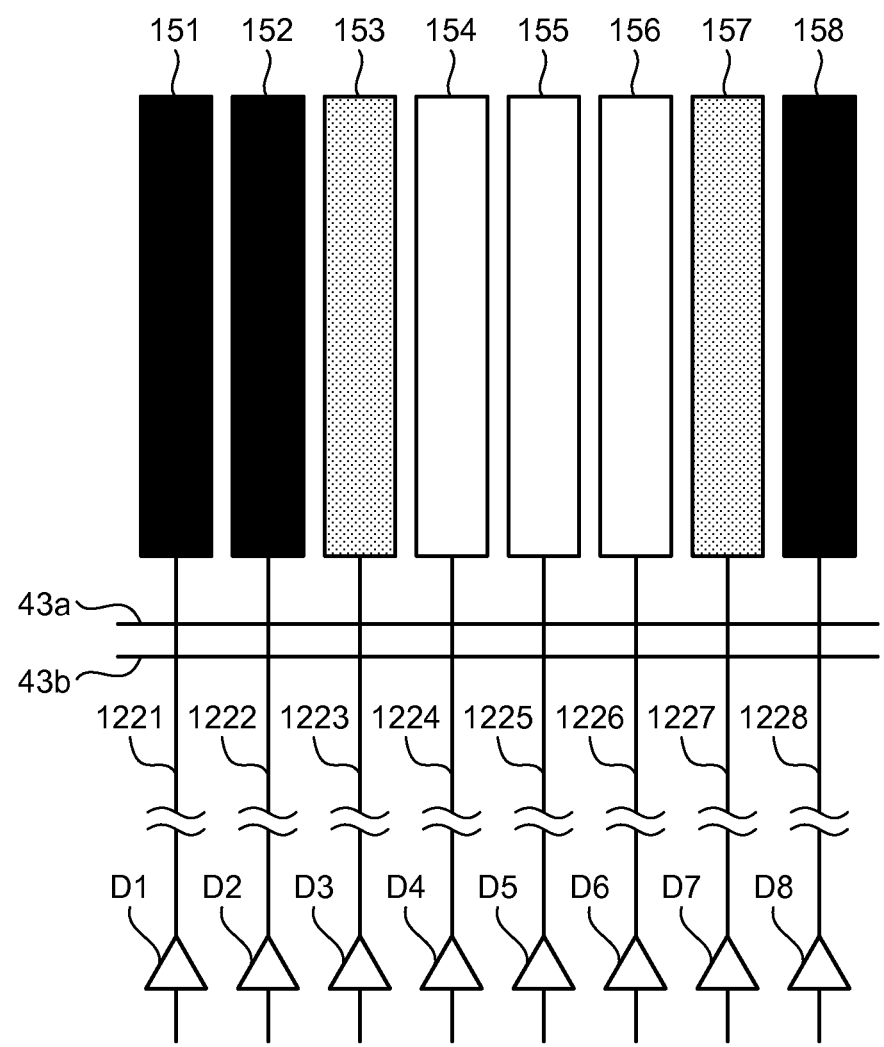
FIG. 23 is a diagram illustrating a second modification of the coupling unit that couples the signal lines together.

FIG. 23 is a diagram illustrating a second modification of the coupling unit that couples the signal lines together. In the second modification illustrated in FIG. 23, wiring lines 43a and 43b, which are provided across the signal lines 1221 to 1228, serve as the coupling unit. The two wiring lines 43a and 43b each have a certain resistance value. The resistance value of the two wiring lines 43a and 43b may be the same or different. The resistance values of the two wiring lines 43a and 43b are appropriately set and the resultant resistance value of the resistance values of the wiring lines 43a and 43b makes it possible to achieve a desired resistance value between each of the signal lines 1221 to 1228.

The second modification using the two wiring lines 43a and 43b also operates in the same manner as described with reference to FIGS. 15 to 17. As a result, a change in brightness of the whole of the display device is smaller than that of the comparative example, thereby further reducing the flicker than that of the comparative example.

Third Modification

Figure 24:
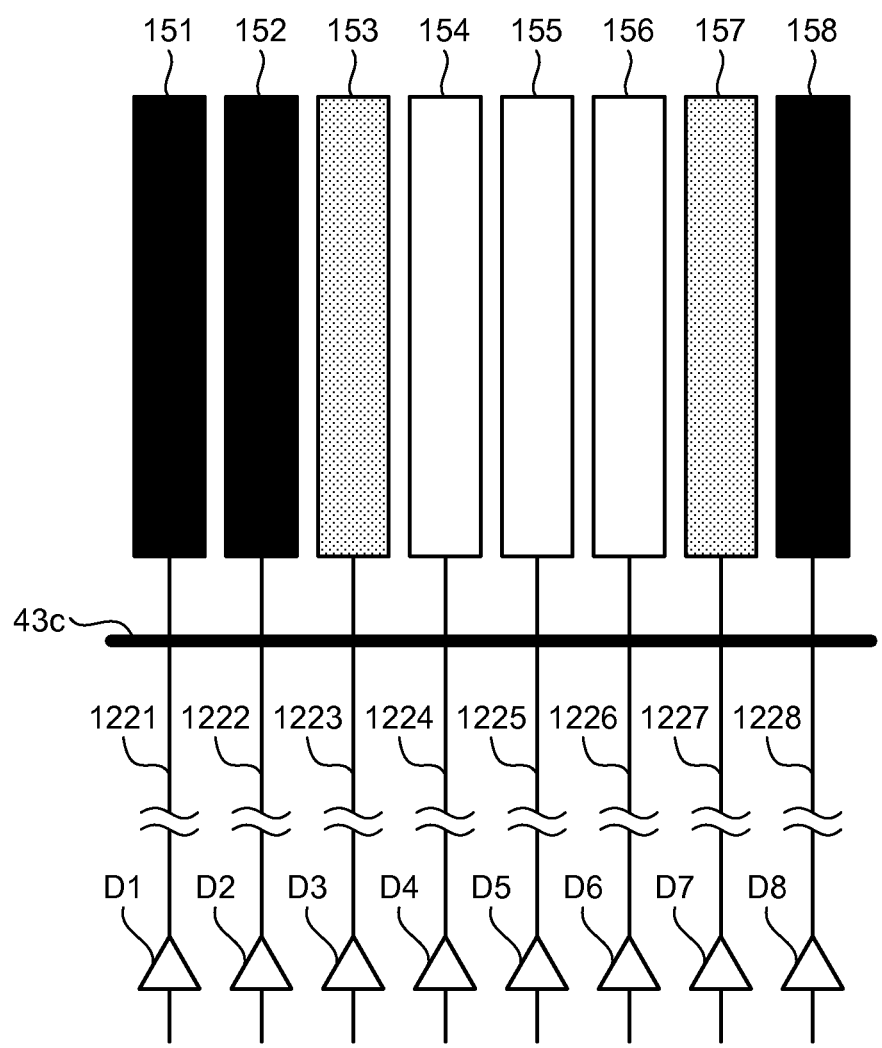
FIG. 24 is a diagram illustrating a third modification of the coupling unit that couples the signal lines together.

FIG. 24 is a diagram illustrating a third modification of the coupling unit that couples the signal lines together. In the third modification illustrated in FIG. 24, a wiring line 43c, which is provided across the signal lines 1221 to 1228, serves as the coupling unit. The line width of the wiring line 43c is larger than that of the wiring line 43 illustrated in FIG. 18. The line width of the wiring line 43c is appropriately set, thereby making it possible to achieve a desired resistance value between each of the signal lines 1221 to 1228. The third modification using the wiring line 43c having a large line width also operates in the same manner as described with reference to FIGS. 15 to 17. As a result, a change in brightness of the whole of the display device is smaller than that of the comparative example, thereby further reducing the flicker than that of the comparative example.

Fourth Modification

In the first to the third modifications, the wiring line or lines are provided across the signal lines 1221 to 1228 instead of the sealant 140 which has conductivity. The wiring line or lines may be provided across the signal lines 1221 to 1228 in addition to a sealant 140. A desired resistance value is achieved between each of the signal lines 1221 to 1228 by the resistive voltage division based on the resistance of the sealant 140 or the wiring line or the wiring lines, and the barrier unit 6 is operated as described above with reference to FIGS. 15 to 17. As a result, a change in brightness of the whole of the display device is smaller than that of the comparative example, thereby further reducing the flicker than that of the comparative example.

Manufacturing Method

Figure 25:
FIG. 25 is a diagram illustrating an example of a manufacturing method of the barrier unit.

The following describes an example of a manufacturing method of the barrier unit 6. FIGS. 25 to 30 are diagrams illustrating an example of the manufacturing method of the barrier unit 6. As illustrated in FIG. 25, the pixel electrodes 122 are formed on the surface of the substrate 121. As a result, the pixel substrate 120 is made.

Figure 26:
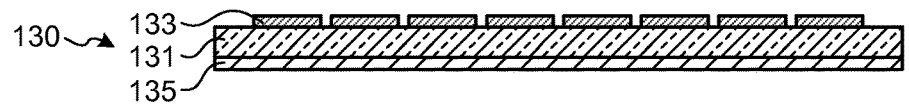
FIG. 26 is a diagram illustrating the example of the manufacturing method of the barrier unit.

As illustrated in FIG. 26, the drive electrodes 133 are formed on the surface of the glass substrate 131. Next, the polarizing plate 135 is provided on the side of the glass substrate 131, where the drive electrodes 133 are not formed.

Figure 27:
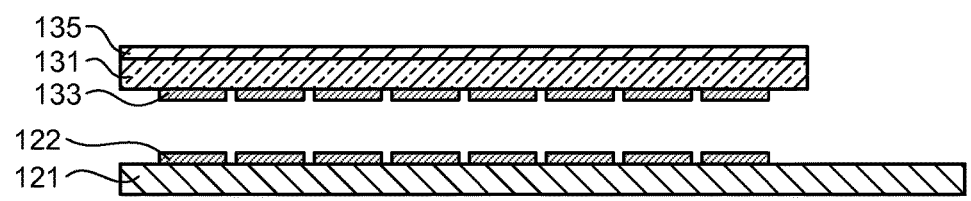
FIG. 27 is a diagram illustrating the example of the manufacturing method of the barrier unit.

The counter substrate 130 and the pixel substrate 120 thus made are bonded. For example, a periphery of the pixel substrate 120 is coated with a sealant having a certain resistance value. As illustrated in FIG. 27, the counter substrate 130, which is turned upside down from the position illustrated in FIG. 26, and the pixel substrate 120 are bonded by the sealant serving as an adhesive. A part of the periphery of the pixel substrate 120 is excluded from being coated with the sealant and that part is used as a filling opening (not illustrated) for filling a liquid crystal.

Figure 28:
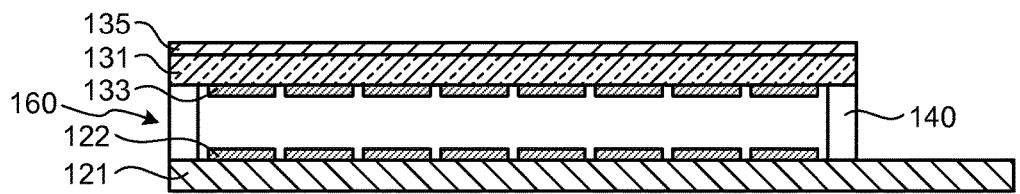
FIG. 28 is a diagram illustrating the example of the manufacturing method of the barrier unit.

FIG. 28 illustrates a state where the pixel substrate 120 and the counter substrate 130 are bonded. As illustrated in FIG. 28, the pixel substrate 120 and the counter substrate 130 are bonded by the sealant 140 that is applied on the pixel substrate 120 and has a certain resistance value.

Figure 29:
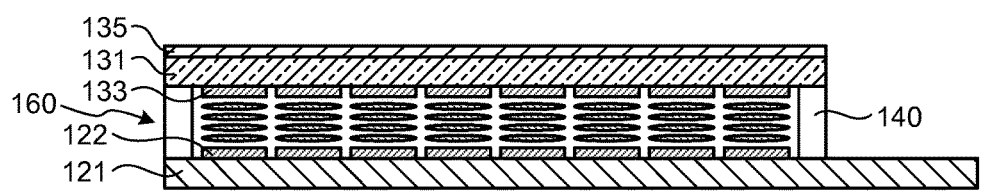
FIG. 29 is a diagram illustrating the example of the manufacturing method of the barrier unit.
Figure 30:
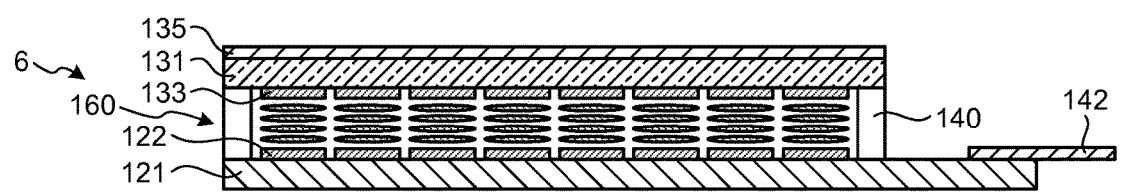
FIG. 30 is a diagram illustrating the example of the manufacturing method of the barrier unit.

Next, as illustrated in FIG. 29, a liquid crystal is filled in a space between the pixel electrodes 122 and the drive electrodes 133 to form the liquid crystal layer 160. The liquid crystal is filled through the filling opening (not illustrated). After the liquid crystal is filled, the filling opening (not illustrated) for filling the liquid crystal is sealed with a sealant (not illustrated). Lastly, as illustrated in FIG. 30, a flexible cable 142 is attached. As a result, the barrier unit 6 is made.

The barrier unit 6 thus made and the display unit 4 are bonded. As a result, the display device 1 illustrated in FIG. 4 is made.

Figure 31:
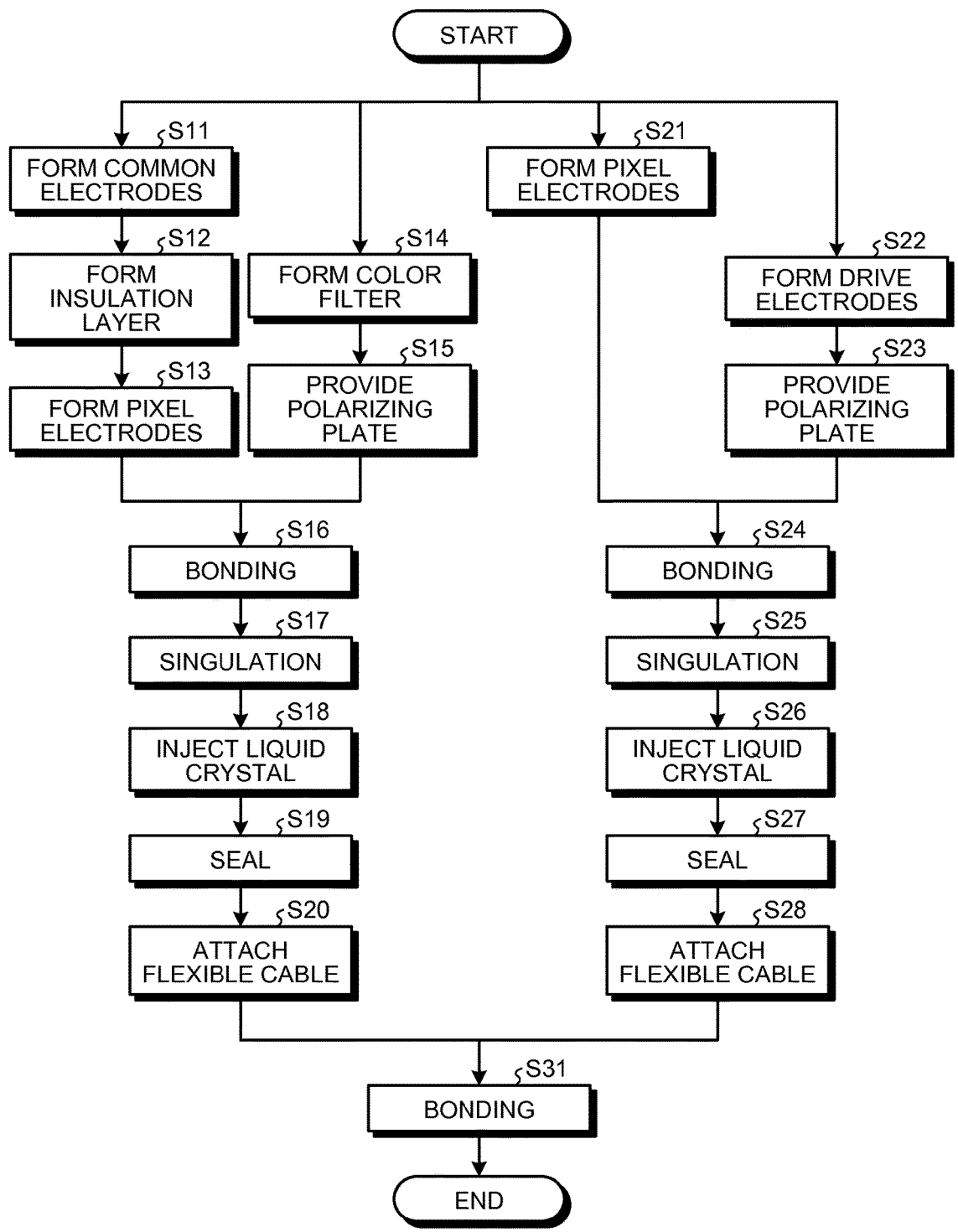
FIG. 31 is a flowchart illustrating an example of a method for manufacturing the display device according to an embodiment.

The following describes a method for manufacturing the display device according to the embodiment with reference to FIG. 31. FIG. 31 is a flowchart illustrating the method for manufacturing the display device according to the embodiment.

At step S11, the common electrodes COML are formed on the surface of the TFT substrate 21. At step S12, the insulation layer 24 is formed on the common electrodes COML. At step S13, the pixel electrodes 22 are formed on the insulation layer 24. As a result, the pixel substrate 20 is made.

At step S14, the color filter 32 is formed on the surface of the glass substrate 31. At step S15, the polarizing plate 35 is provided on the surface of the glass substrate 31 where the color filter 32 is not formed. As a result, the counter substrate 30 is made.

At step S16, the pixel substrate 20 is coated with the sealant 40, the counter substrates 30 is turned upside down, and then the pixel substrate 20 and the counter substrate 30 are bonded. A part of the pixel substrate 20 is excluded from being coated with the sealant 40 and that part is used as the liquid crystal filling opening.

At step S17, when display devices are manufactured simultaneously, a product thus obtained by bonding the pixel substrate 20 to the counter substrates 30 is divided into individual pieces of the display devices. At step S18, a liquid crystal is filled from the liquid crystal filling opening. At step S19, the liquid crystal filling opening is sealed with a sealant to seal the liquid crystal. At step S20, the flexible cable 42 is attached. As a result, the display unit 4 is made.

At step S21, the pixel electrodes 122 are formed on the surface of the substrate 121. As a result, the pixel substrate 120 is made. At step S22, the drive electrodes 133 are formed on the surface of the glass substrate 131. At step S23, the polarizing plate 135 is provided on the surface of the glass substrate 131 where the drive electrodes 133 are not formed. As a result, the counter substrate 130 is made.

At step S24, the pixel substrate 120 is coated with the sealant 140, the counter substrates 130 is turned upside down, and then the pixel substrate 120 and the counter substrate 130 are bonded. A part of the pixel substrate 120 is excluded from being coated with the sealant 140 and that part is used as the liquid crystal filling opening. In the bonding of the pixel substrate 120 and the counter substrate 130, the sealant 140 makes contact with signal lines corresponding to the pixel electrodes 122 across the signal lines.

At step S25, when display devices are manufactured simultaneously, a product thus obtained by bonding the pixel substrate 120 to the counter substrates 130 is divided into individual pieces of the display devices. At step S26, a liquid crystal is filled from the liquid crystal filling opening. At step S27, the liquid crystal filling opening is sealed with a sealant to seal the liquid crystal. At step S28, the flexible cable 142 is attached. As a result, the barrier unit 6 is made.

At step S31, the display unit 4 and the barrier unit 6 are adhesively bonded with an adhesive, for example. Through the steps described above, the display device is made.

The manufacturing method described above includes the following: the display unit 4 that displays an image is formed (steps S11 to S19 in FIG. 31), the parallax adjuster (the barrier unit 6) including a plurality of unit areas, each of which is set to a light transmission state in accordance with positions of the right and the left eyes and a pixel display of pixels of a right eye image and pixels of a left eye image, is formed (steps S21 to S28 in FIG. 31), and the coupling unit is formed that electrically couples a plurality of electrical elements provided corresponding to the respective unit areas of the parallax adjuster, each of the electrical elements applying a signal to set the light transmission state to a corresponding unit area, the coupling unit providing a certain resistance value between the electrical elements (step S24 in FIG. 31). The manufacturing method provides the display device that can reduce the flicker in tracking.

2. APPLICATION EXAMPLES

Figure 32:
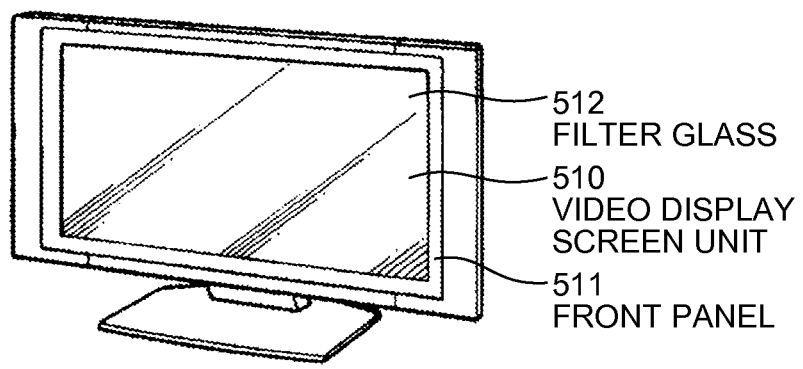
FIG. 32 is a diagram illustrating an example of an electronic apparatus to which the display device according to the embodiment is applied.
Figure 33:
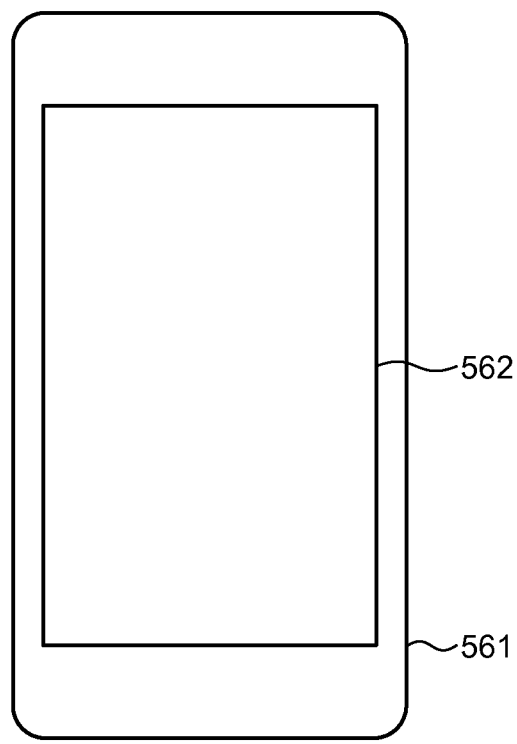
FIG. 33 is a diagram illustrating another example of the electronic apparatus to which the display device according to the embodiment is applied.

The following describes application examples of the display device 1 described in the embodiment and the modifications with reference to FIGS. 32 and 33. FIGS. 32 and 33 are diagrams each illustrating an example of an electronic apparatus to which the display device 1 according to the embodiments is applied. The display device 1 according to the embodiment and the modifications can be applied to all the fields of electronic apparatuses such as television apparatuses, digital cameras, notebook personal computers, portable terminals such as portable phones, and video cameras. In other words, the display device 1 according to the embodiment and the modifications can be applied to all the fields of electronic apparatuses displaying an externally input video signal or an internally generated image signal as an image or a video.

Application Example 1

The electronic apparatus illustrated in FIG. 32 is a television apparatus to which the display device 1 according to the embodiment and the modifications is applied. The television apparatus includes a video display screen unit 510 having a front panel 511 and a filter glass 512, for example. The video display screen unit 510 is the display device 1 according to the embodiment and the modifications.

Application Example 2

The electronic apparatus illustrated in FIG. 33 is an information portable terminal that operates as a portable computer, a multi-functional portable phone, a portable computer having a voice communication function, or a portable computer having a communication function, and may also be called a smartphone or a tablet terminal. The information portable terminal includes a housing 561 having a display unit 562 on the surface thereof, for example. The display unit 562 is the display device 1 according to the embodiment and the modifications.

The present disclosure is not limited to the embodiment, the modifications, and the modification examples described above and can be modified in various ways.

For example, in the embodiment and the modifications, the type of touch sensor may be any of an electrostatic capacitance type, an optical type, and a resistive type.

In the embodiment and the modifications, a liquid crystal display device is exemplified as the disclosure. Examples of the disclosure include any of flat panel type display devices such as an electroluminescence (EL) display device, a self-light-emitting display device, and an electric paper type display device having electrophoresis elements. The size of the display device is not limited to a specific size. The available size is from a medium and small size to a large size.

It should be noted that those skilled in the art may make various changes and modifications in the scope of the invention, and the changes and the modifications are also within the scope of the invention. For example, the addition or deletion of the elements or changing of the design, or the addition or omission of the processes or the changing of processing conditions in the embodiment and modifications described above that are appropriately done by those skilled in the art are within the scope of the invention as long as the gist of the invention is not deviated.

Other operations and effects provided by the aspects described in the embodiment that are apparent from the description of the specification and envisioned by those skilled in the art are understood that those are provided by the invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device, comprising:
a display unit that includes a plurality of pixels arranged therein, and that displays an image by the pixels;
a parallax adjuster that includes a plurality of unit areas;
a controller that detects positions of a right eye and a left eye of a user on the basis of a photographic image of the user, determines a pixel display of pixels of a right eye image and a left eye image that are displayed on the display unit, in accordance with the detected positions of the right eye and the left eye, and sets a light transmission state to the unit areas included in the parallax adjuster in accordance with the positions of the right eye and the left eye and the pixel display;
a plurality of conductors provided corresponding to the respective unit areas and each of the conductors applies a signal to set the light transmission state to a corresponding unit area; and
a coupling unit that electrically couples the conductors together, the coupling unit providing a certain resistance value between the conductors,
wherein the coupling unit is disposed across the conductors so as to be in contact with the conductors,
wherein among the conductors, a conductor is interposed between two adjacent conductors, and the two adjacent conductors are applied by two different voltages,
wherein the conductor interposed between the two adjacent conductors is set to a state in which no signal is applied to the conductor,
wherein the conductor interposed between the two adjacent conductors is applied by an intermediate potential between the two different voltages based on the certain resistance value of the coupling unit, and
wherein the two adjacent conductors and the conductor interposed between the two adjacent conductors are configured to be changed among the conductors when an eye tracking is performed.

2. The display device according to claim 1, wherein
the conductors are a plurality of electrodes corresponding to the respective unit areas of the parallax adjuster, and
the coupling unit is a sealant that has the certain resistance value, makes contact with a plurality of signal lines corresponding to the respective unit areas of the parallax adjuster, and seals a liquid crystal filled in a space corresponding to the unit areas.

3. The display device according to claim 1, wherein
the conductors are signal lines for the parallax adjuster, and
the coupling unit is a wiring line that has the certain resistance value and electrically couples the signal lines together.

4. The display device according to claim 1, further comprising a plurality of circuits that are provided corresponding to the respective conductors and each of which is capable of being set to one of a state in which the circuit applies a signal to a corresponding conductor and a state in which the circuit does not apply a signal to the corresponding conductor, wherein a circuit corresponding to the conductor interposed between the two adjacent conductors is set to the state in which the circuit does not apply a signal to the corresponding conductor.

5. The display device according to claim 4, wherein
the circuits are driver circuits provided to the controller, and
the state in which the circuit does not apply a signal to the corresponding conductor is a state in which an output side of the driver circuit is high impedance.

6. The display device according to claim 4, wherein
the circuits are driver circuits provided to the parallax adjuster, and
the state in which the circuit does not apply a signal to the corresponding conductor is a state in which an output side of the driver circuit is high impedance.

7. A method for manufacturing a display device, the method comprising:
forming a display unit that displays an image;
forming a parallax adjuster including a plurality of unit areas each of which is set to a light transmission state in accordance with positions of the right and the left eyes and a pixel display of pixels of a right eye image and a left eye image that are displayed on the display unit, and
forming a coupling unit that electrically couples a plurality of electrical elements provided corresponding to the respective unit areas of the parallax adjuster, each of the electrical elements applying a signal to set the light transmission state to a corresponding unit area, the coupling unit providing a certain resistance value between the electrical elements,
wherein the coupling unit is disposed across the electrical elements so as to be in contact with the electrical elements,
wherein among the electrical elements, an electrical element is interposed between two adjacent electrical elements, and the electrical elements are applied by two different voltages,
wherein the electrical element interposed between the two adjacent electrical elements is set to a state in which no signal is applied to the electrical element,
wherein the electrical element interposed between the two adjacent electrical elements is applied by an intermediate potential between the two different voltages based on the certain resistance value of the coupling unit, and
wherein the two adjacent electrical elements and the electrical element interposed between the two adjacent electrical elements are configured to be changed among the electrical elements when an eye tracking is performed.

* * * * *